United States Patent
Agiwal et al.

(10) Patent No.: US 10,314,007 B2
(45) Date of Patent: Jun. 4, 2019

(54) APPARATUS AND METHOD FOR TRANSMITTING/RECEIVING PAGING CHANNEL SIGNAL IN WIRELESS COMMUNICATION NETWORK

(71) Applicant: Samsung Electronics Co., Ltd, Gyeonggi-do (KR)

(72) Inventors: Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 15/473,522

(22) Filed: Mar. 29, 2017

(65) Prior Publication Data
US 2017/0339665 A1 Nov. 23, 2017
US 2018/0115959 A9 Apr. 26, 2018

Related U.S. Application Data

(62) Division of application No. 14/893,007, filed as application No. PCT/KR2014/004453 on May 21, 2014.

(30) Foreign Application Priority Data

May 21, 2013 (IN) .............. 2225/CHE/2013
Mar. 6, 2014 (IN) .............. 2225/CHE/2013

(51) Int. Cl.
*H04W 68/00* (2009.01)
*H04W 68/02* (2009.01)
(Continued)

(52) U.S. Cl.
CPC .......... *H04W 68/02* (2013.01); *H04B 7/0408* (2013.01); *H04W 56/00* (2013.01); *H04W 68/00* (2013.01); *H04W 16/28* (2013.01)

(58) Field of Classification Search
CPC ..... H04W 68/02; H04W 56/00; H04W 68/00; H04B 7/0408
See application file for complete search history.

(56) References Cited

U.S. PATENT DOCUMENTS

2006/0111127 A1* 5/2006 Jang .................. H04W 68/00 455/458
2009/0274112 A1 11/2009 Ma et al.
(Continued)

FOREIGN PATENT DOCUMENTS

| CN | 101128027 | 2/2008 |
| JP | 2011-72010 | 4/2011 |
| KR | 10-2011-0079809 | 7/2011 |

OTHER PUBLICATIONS

International Search Report dated Aug. 22, 2014 in connection with International Patent Application No. PCT/KR2014/004530, 4 pages.
(Continued)

*Primary Examiner* — Marisol Figueroa

(57) ABSTRACT

A method of transmitting paging in a wireless communication network is provided. The method includes transmitting a plurality of paging channels using a plurality of distinct transmitting (TX) beams in a paging available interval by a paging transmitter (PT), each of the plurality of paging channels comprising same paging information; and transmitting a plurality of synchronization channels (SCHs) and/or broadcast channels (BCHs) using a plurality of distinct TX beams, each of the plurality of SCHs comprising a synchronization sequence, and each of the plurality of BCHs comprising system parameters, wherein the TX beams are transmitted in one or more time durations through one or more antenna arrays.

17 Claims, 29 Drawing Sheets

(51) Int. Cl.
*H04W 56/00* (2009.01)
*H04B 7/0408* (2017.01)
*H04W 16/28* (2009.01)

(56) References Cited

U.S. PATENT DOCUMENTS

| | | |
|---|---|---|
| 2010/0040015 A1 | 2/2010 | Ernstrom et al. |
| 2010/0165873 A1 | 7/2010 | Higuchi et al. |
| 2012/0030358 A1 | 2/2012 | MacKenzie |
| 2014/0204772 A1* | 7/2014 | Zhang .................. H04W 24/10 370/252 |

OTHER PUBLICATIONS

NTT DoCoMo, et al., "Paging Channel Structure for E-UTRA Downlink", 3GPP TSG RAN WG1 Meeting #45, R1-061199, Shanghai, China, May 8-12, 2006, 15 pages.
Foreign Communication from Related Counterpart Application, European Patent Application 14800517.6, Extended European Search Report and European Search Opinion dated Apr. 12, 2017, 13 pages.
LG Electronics, "Transmission of LTE Paging", 3GPP TSG-RAN WG2 #59, R2-073356, Athens, Greece, Aug. 20-24, 2007, 3 pages.
Communication from a foreign patent office in a counterpart foreign application, State Intellectual Property Office of the People's Republic of China, "The First Office Action," Application No. CN 201480029856.X, Jun. 1, 2018, 24 pages.

* cited by examiner

Paging channel is received using the best Rx beam. Best Rx beam is the one which is used for decoding the sync signal & BCH in F8, F9

APPARATUS AND METHOD FOR TRANSMITTING/RECEIVING PAGING CHANNEL SIGNAL IN WIRELESS COMMUNICATION NETWORK

CROSS-REFERENCE TO RELATED APPLICATION(S)

The present application is a divisional of U.S. patent application Ser. No. 14/893,007 filed Nov. 20, 2015, which is related to and claims priority under 35 U.S.C. § 365 to International Patent Application No. PCT/KR2014/004530 filed May 21, 2013, entitled "APPARATUS AND METHOD FOR TRANSMITTING/RECEIVING PAGING IN A BEAM FORMED WIRELESS COMMUNICATION NETWORK", and through International Patent Application No. PCT/KR2014/004530, to Indian Patent Application No. 2225/CHE/2013 filed May 21, 2013, and Indian Patent Application No. 2225/CHE/2013 filed Mar. 6, 2014, and which are incorporated herein by reference into the present disclosure as if fully set forth herein.

TECHNICAL FIELD

The present disclosure relates to an apparatus and method for transmitting and receiving paging in a beam formed wireless communication network.

BACKGROUND ART

In the recent years, several broadband wireless technologies have been developed to meet the growing number of broadband subscribers and to provide more and better applications and services. The $3^{rd}$ generation partnership project 2 (3GPP2) developed code division multiple access 2000 (CDMA 2000), 1× evolution data optimized (1× EVDO) and ultra mobile broadband (UMB) systems. The 3rd generation partnership project (3GPP) developed wideband code division multiple access (WCDMA), high speed packet access (HSPA) and long term evolution (LTE) systems. The institute of electrical and electronics engineers developed mobile worldwide interoperability for microwave access (WiMAX) systems. As number of users of mobile communication is increasing along with number of services provided over these systems, there is a need of mobile communication with large capacity, high throughput, lower latency and better reliability.

Super mobile broadband (SMB) system based on millimeter waves i.e. radio waves with wavelength in the range of 1 millimeter (mm) to 10 mm, which corresponds to a radio frequency of 30 gigahertz (GHz) to 300 GHz, is a candidate for next generation mobile communication technology as vast amount of spectrum is available in mmWave band. An SMB network consists of multiple SMB base stations (BSs) that cover a geographic area. In order to ensure good coverage, SMB base stations need to be deployed with higher density than macro-cellular base stations. In general, roughly the same site-to-site distance as macrocell or Pico-cell deployment in an urban environment is recommended. At higher frequency the propagation path losses are higher and hence the propagation distance is shorter. Beamforming techniques are used to decrease the high path loss and to increase the propagation distance for communication at higher frequency. Beamforming can be classified into transmission (TX) beamforming performed in a transmitting end and reception (RX) beamforming performed in a receiving end. In general, the TX beamforming increases directivity by narrowing an area in which the propagation is directed by using a plurality of antennas. In this situation, aggregation of the plurality of antennas can be referred to as an antenna array, and each antenna included in the array can be referred to as an array element.

The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases RX signal strength in a specific direction by increasing the antenna gain in a specific direction, and excludes a signal transmitted in a direction other than the specific direction from the RX signal, thereby providing an effect of blocking an interference signal.

The frame structure for one such wireless communication using beamforming technique is illustrated in FIG. 1. The BS transmits a synchronization signal through a synchronization channel (SCH) which assists MS to detect the presence of base station. The BS also transmits broadcast signal through a broadcast channel (BCH). The BCH carries essential system information which enables MS to have initial communication with the BS. The SCH and BCH are transmitted repetitively by performing beamforming on the channels with different transmission beams wherein each TX beam transmits the SCH and BCH in different direction. Because of hardware limitation of one antenna array at the BS (one antenna array is needed for one beam direction) the TX beams in different directions are transmitted at different times. The mobile station (MS) uses receive beamforming to detect the synchronization signal. The mobile station (MS) uses multiple RX beams to detect the SCH transmitted using multiple TX beams. Consider for example, SCH and BCH is transmitted using four TX beams and MS uses four RX beams to search the SCH and BCH. Four TX beams are transmitted in four different time durations (e.g., slots) in a sub frame on the high frequency carrier as illustrated in FIG. 1.

DISCLOSURE OF INVENTION

Technical Problem

In conventional wireless communication system, paging is transmitted to page mobile stations which are attached to the wireless communication network but are in idle mode. In the idle mode, MS wake ups at regular intervals for short periods to receive paging and other broadcast information. In beam formed wireless communication system, paging cannot be broadcasted.

Therefore, there is a need for Paging channel operation in a beam-formed system which is not disclosed in the state of the art. It needs to be defined such that MS wakeup time is minimized as much as possible.

The above information is presented as background information only to assist with an understanding of the present disclosure. No determination has been made, and no assertion is made, as to whether any of the above might be applicable as prior art with regard to the present disclosure.

Solution to Problem

An objective of the present disclosure is to provide a system and method for transmitting and receiving paging in a beamformed wireless communication network.

An embodiment of the present disclosure describes a method of transmitting paging in a wireless communication network. The method comprising transmitting a plurality of paging channels using a plurality of distinct transmitting (TX) beams in a paging available interval by a paging transmitter, each said paging channel comprises of same paging information, transmitting plurality of synchronization channels (SCH) and/or broadcast channels (BCH) using a plurality of distinct TX beams wherein the each said synchronization channel comprises of synchronization sequence and each said broadcast channel comprises of system parameters, said TX beams being transmitted in one or more time durations through one or more antenna arrays.

Another embodiment of the present disclosure describes a method of receiving paging in a wireless communication network, the method comprises determining a wakeup time based on paging location in paging available interval, location of SCH and the number of received beams supported by a paging receiver, performing a search for one or more SCH and one or more BCH when the paging receiver wakes-up at the determined time, performing downlink (DL) synchronization by the paging receiver using the received SCH and/or BCH, determining the best RX beam by the paging receiver, wherein the said best RX beam is the RX beam used by the paging receiver to successfully receive the SCH and/or BCH from a paging transmitter, and receiving one or more paging channels in the paging available interval using the determined best RX beam amongst the plurality of RX beams supported by the paging receiver wherein the plurality of paging channels are transmitted in the paging available interval by the paging transmitter using multiple TX beams.

Yet another embodiment of the present disclosure describes a method of receiving paging in a beam formed wireless communication network, the method comprises determining wake-up time based on paging location in a paging available interval, location of SCH and number of RX beams supported by paging receiver, performing a search for one or more SCH and/or one or more BCH when the paging receiver wakes-up at the determined time, performing DL synchronization by the paging receiver using the received SCH and/or BCH, monitoring the time duration in the paging available interval by the paging receiver where a first set of paging channels are transmitted using multiple TX beams, receiving the paging channels using a first RX beam, and monitoring a time duration where the next set of paging channels are transmitted using multiple TX beams when the paging receiver fails to receive and decode the paging channel using the RX beam in the time duration where the first set of paging channels being transmitted, receiving the paging channels using a second RX beam wherein the second RX beam is other than the RX beam previously used.

Further embodiment of the present disclosure describes a method of transmitting paging in a wireless communication network, the method comprising transmitting plurality of paging channels using plurality of distinct TX beams in a paging available interval by a paging transmitter to an paging receiver, each of said paging channel comprises of same paging information and broadcast channel information, transmitting plurality of paging synchronization channel using plurality of distinct TX beams in a paging available interval by a paging transmitter to paging receiver, each of said paging synchronization channel comprises of synchronization sequence, transmitting plurality of SCHs and/or BCHs over multiple TX beams periodically wherein the each said synchronization channel comprises of synchronization sequence and each said broadcast channel comprises of system parameters, said TX beams being transmitted in one or more time duration through one or more antenna arrays.

Further embodiment of the present disclosure describes a method of receiving paging in a wireless communication network, the method comprising waking-up of an paging receiver at the beginning of a paging location in a paging available interval, monitoring a time duration by the paging receiver in paging available interval where a first set of paging synchronization channels and paging channels being transmitted using multiple TX beams, receiving the paging synchronization channel and paging channel transmissions using a first RX beam wherein the first RX beam comprises any RX beam from a plurality of RX beams, monitoring a time duration where the next set of paging synchronization channels and paging channels being transmitted using multiple TX beams when paging receiver fails to receive and decode the paging synchronization channel and paging channel using a selected RX beam in the time duration where the first set of paging synchronization channels and paging channels being transmitted, and receiving the paging synchronization channel and paging channel transmissions using a second receiving (RX) beam wherein the second RX beam is other than the RX beam previously used.

Further embodiment of the present disclosure describes a method of receiving paging in a beam formed wireless communication network, the method comprises determining wake-up time based on paging location in a paging available interval, location of SCH and number of received beams supported by an paging receiver, performing a search for one or more SCH and one or more BCH when the paging receiver wakes-up at the determined time, performing DL synchronization by the paging receiver using the received SCH and/or BCH, monitoring a time duration by the paging receiver where a first set of paging synchronization channels and paging channels being transmitted using multiple TX beams, receiving the paging synchronization channels and paging channels using an RX beam, said RX beam being a first RX beam, any RX beam or the best RX beam determined using SCH/BCH, and monitoring a time duration where the next set of paging synchronization channels and paging channels being transmitted using multiple TX beams when the paging receiver fails to receive and decode the paging synchronization channel and paging channel using the selected RX beam in the time duration where the first set of paging synchronization channels and paging channels being transmitted; and receiving the paging channel transmission using a RX beam other than the RX beam previously used.

Further embodiment of the present disclosure describes a method of receiving paging in a beam formed wireless communication network, the method comprises waking-up of an paging receiver at the beginning of paging available interval, monitoring a time duration by the paging receiver where the SCH and/or BCH using multiple TX beams being transmitted, receiving the SCH and/or BCH transmissions using a RX beam, said RX beam being any RX beam, and determining if SCH and/or BCH transmission being successfully received or not, receiving the paging channels in the time duration where a first set of paging channel being transmitted if the SCH and/or BCH transmission being successfully received, receiving the paging synchronization channels and paging channels in the time duration where a first set of paging synchronization channel and paging channel being transmitted if the SCH and/or BCH transmission being not successfully received.

In the methods described in the present disclosure, the paging transmitter can be a base station (BS) or enhanced node B or any other network node. In the methods described in the present disclosure the paging receiver can be user equipment (UE) or mobile station or any other receiver capable of receiving the paging.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The aforementioned aspects and other features of the present disclosure will be explained in the following description, taken in conjunction with the accompanying drawings, wherein:

FIGS. 27a to 26b illustrate a flowchart depicting a method of receiving paging information by paging receiver, according to yet further embodiment.

MODE FOR THE INVENTION

Figure 1:
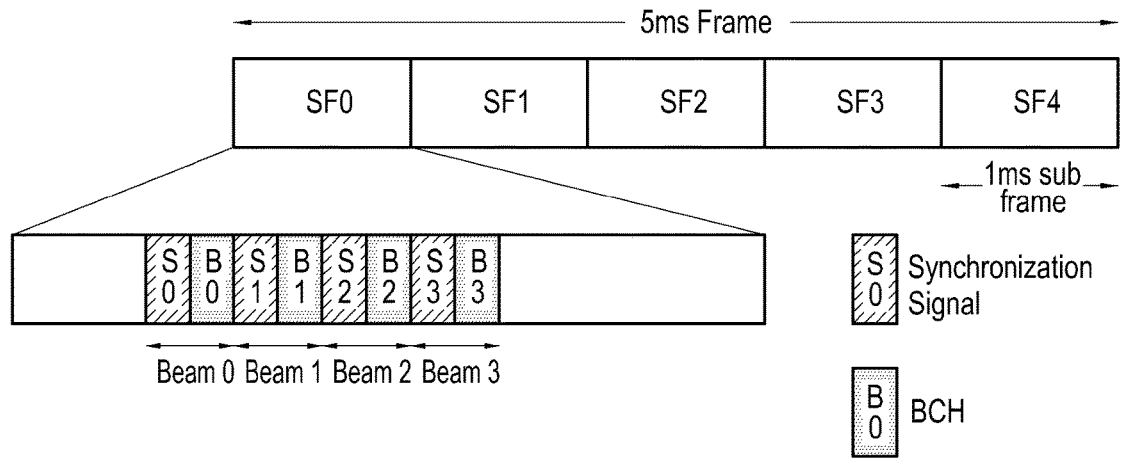
FIG. 1 illustrates a schematic diagram depicting a frame structure in a beam formed wireless communication system, in the context of the disclosure.

The embodiments of the present disclosure will now be described in detail with reference to the accompanying drawings. However, the present disclosure is not limited to the embodiments. The present disclosure can be modified in various forms. Thus, the embodiments of the present disclosure are only provided to explain more clearly the present disclosure to the ordinarily skilled in the art of the present disclosure. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A method and apparatus proposed in various embodiments of the present disclosure may be applied to any of various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

Figure 2:
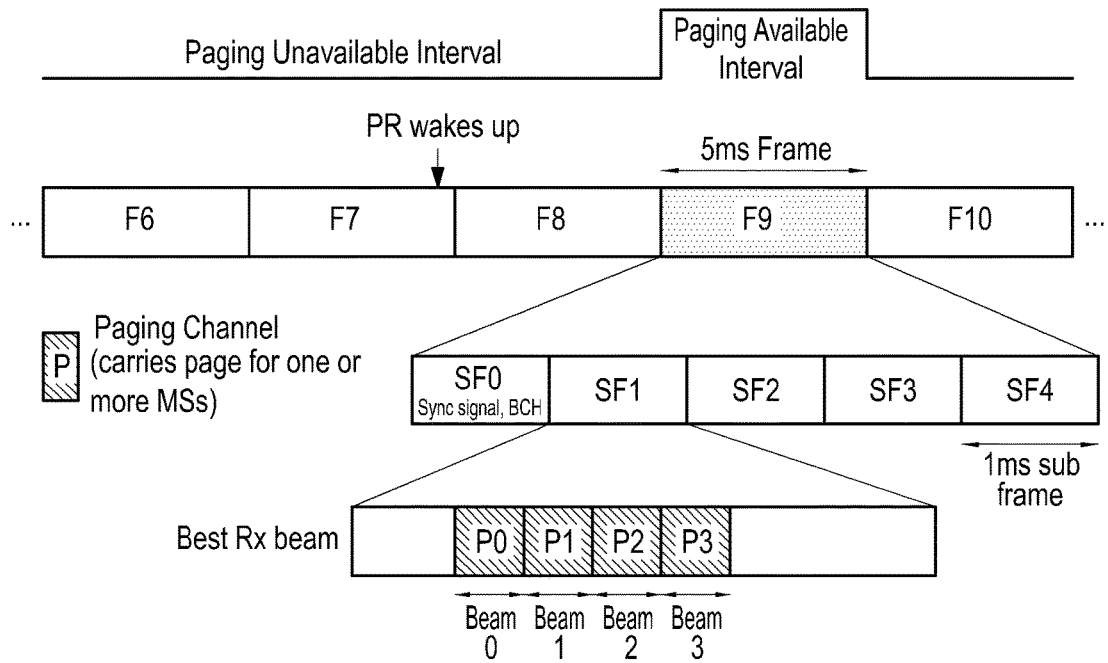
FIG. 2 illustrates a schematic diagram depicting transmission and reception of paging information on a paging channel using 'N' transmitting (Tx) beams in paging available interval, according to one embodiment.

FIG. 2 illustrates a schematic diagram depicting transmission and reception of paging information on a paging channel using 'N' transmitting (TX) beams in paging available interval, according to one embodiment.

According to one embodiment of the paging channel transmission, the paging channel carrying paging information is transmitted using 'N' transmitting (TX) beams in the paging available interval. The paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The paging channel transmission using 'N' TX beams is not repeated for multiple receive (RX) beams in paging receiver (PR) which means that only one set of 'N' TX beams is transmitted by paging transmitter (PT). In a beamformed system paging receiver (PR) typically receives the transmission using multiple RX beams wherein the paging receiver (PR) uses one RX beam to receive one set of 'N' TX beams and same is repeated for each RX beam.

The paging available interval can be of one frame duration wherein each frame comprises of multiple sub frames. Paging channel may be present in one or more SFs of paging available interval wherein the paging channel in different SFs carries different paging information (e.g. Different set of paging receivers (PR) may be assigned different SF for paging). In one method the sub frame zero (SF0) may not be used for paging channel. The number of paging channel TX beams in this embodiment of the disclosure is equal to the number of SCH/BCH beams. The order of transmission of TX beams for paging channel is same as order of SCH/BCH beams. Paging channel sub frame for paging may be fixed (pre-specified) i.e. paging channel for all paging receivers (PR) in a paging available interval is fixed. Alternately paging channel SF in paging available interval can be specific to paging receiver (PR). BCH may indicate if paging is there in PAI or not. BCH of PAI Frame and up to P frames before PAI should include paging indicator for paging in PAI Frame. The resources for paging channel transmissions in paging SF may be fixed or indicated by a control channel.

Figure 3:
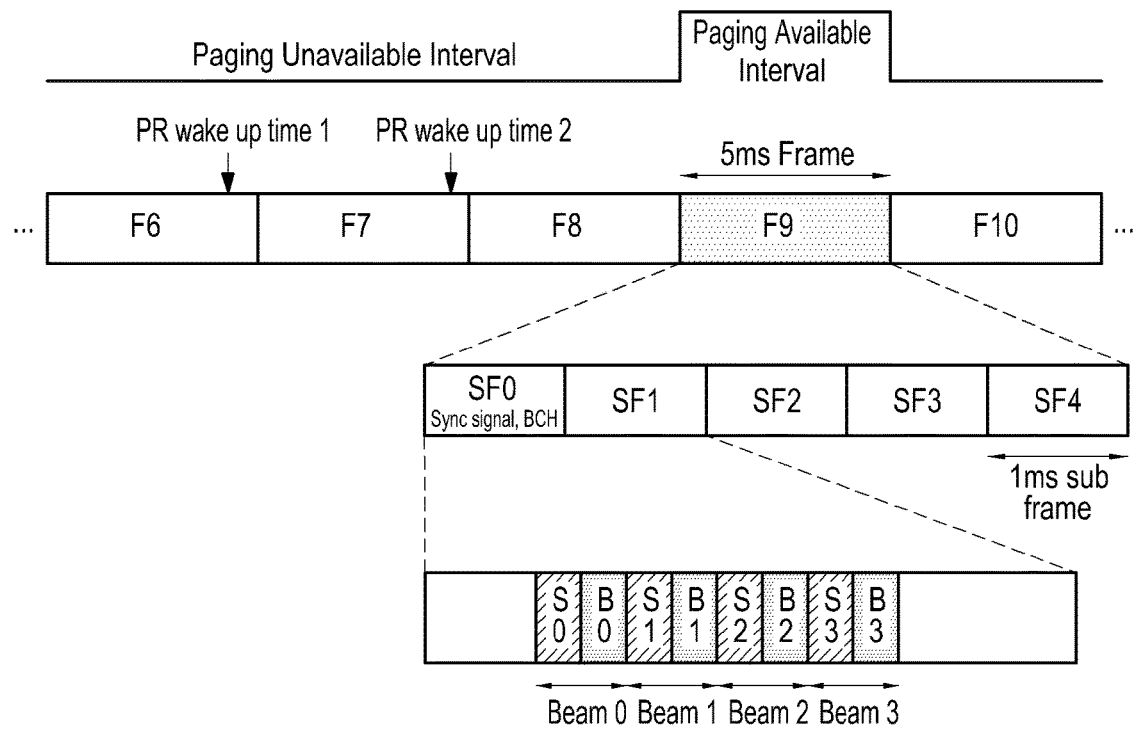
FIG. 3 illustrates a schematic diagram depicting a paging receiver wake up time for reception of paging information, according to one embodiment.

FIG. 3 illustrates a schematic diagram depicting a paging receiver wake up time for reception of paging information, according to one embodiment.

According to one embodiment of the Paging Channel Reception, paging receiver (PR) determines the wake up time before the paging available interval. The number of frames paging receiver (PR) wakes up early before the paging available interval depends on the location of paging channel in paging available interval, the location of SCH/BCH and the number of receive beams used by paging receiver to receive transmissions from paging transmitter (PT). As illustrated in FIG. 3, the paging receiver uses two RX beams for receiving the transmissions from the paging transmitter (PT). If the paging is transmitted in SF0 of paging available interval then paging receiver wakes up at paging receiver wake up time 1 or paging receiver wake up time 2 depending on whether the paging is located before the SCH/BCH transmissions in SF0 or paging is located after the SCH/BCH transmissions in SF0. If the paging is located before the SCH/BCH transmissions in SF0 of frame F9 then paging receiver wakes up at paging receiver wake up time 1 (i.e. before the frame F7) and the RX beam for receiving the paging channel is the RX beam used to receive synchronization signal and BCH in F7 & F8. If the paging is located after the SCH/BCH transmissions in SF0 of frame F9 then paging receiver wakes up at paging receiver wake up time 2 (i.e. before the frame F8) and the RX beam for receiving the paging channel is the RX beam used to receive synchronization signal and BCH in F8 & F9. If the paging is located in any sub frames from SF1 to SF4 of frame F9 then paging receiver wakes up at paging receiver wake up time 2 (i.e. before the frame F8) and the RX beam for receiving the paging channel is the RX beam used to receive SCH/BCH in F8 & F9. Paging receiver wakes up at the determined wake up time and start searching for SCH/BCH. Paging receiver then performs the DL synchronization based on received SCH/BCH.

Figure 4:
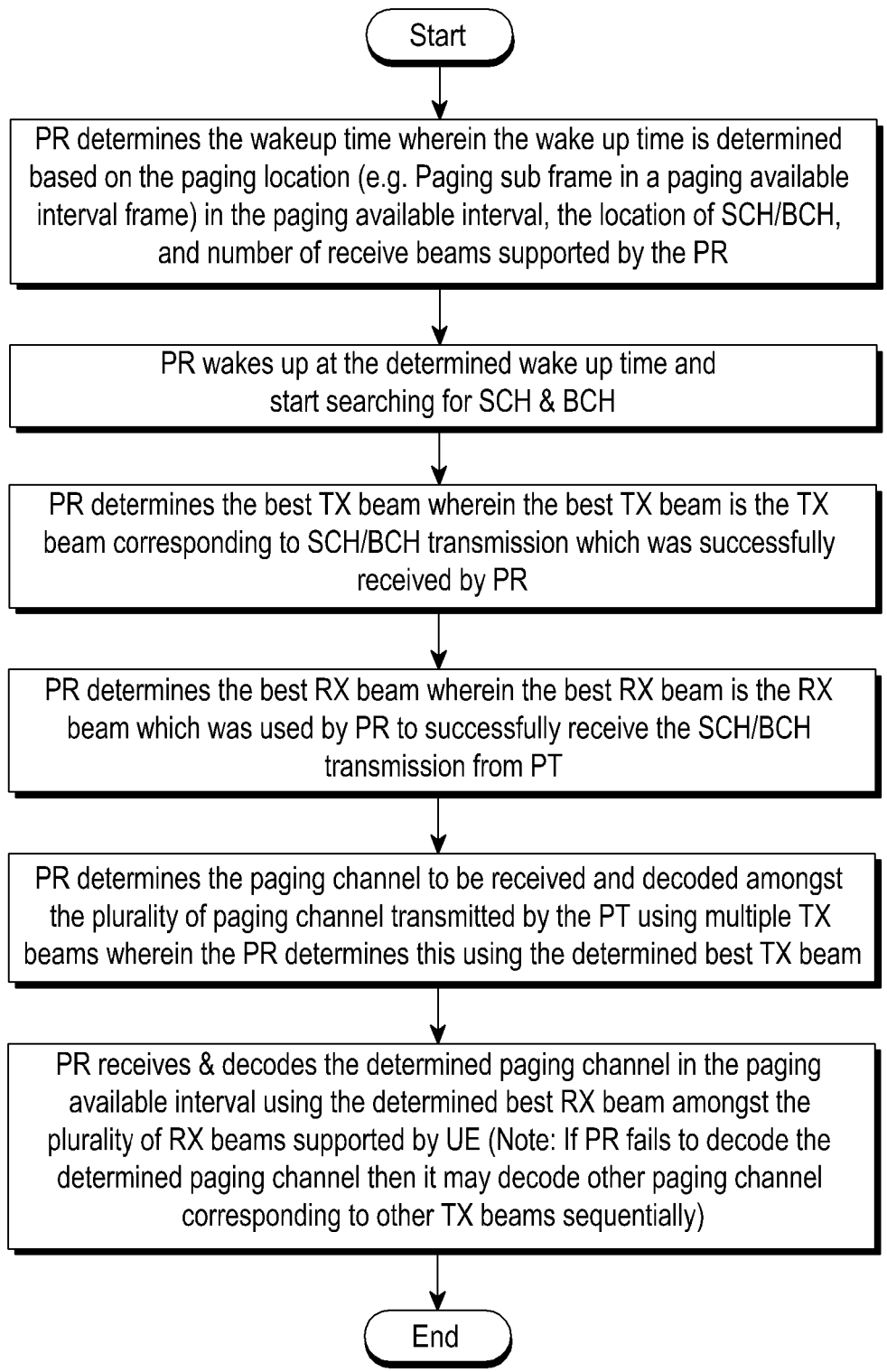
FIG. 4 illustrates a flow diagram of a method of receiving paging information by paging receiver, according to one embodiment.

FIG. 4 illustrates a flow diagram of a method of receiving paging information by paging receiver, according to one embodiment. Paging receiver (PR) determines the best TX beam wherein the best TX beam is the TX beam corresponding to SCH/BCH transmission which was successfully received by paging receiver. Paging receiver determines the best RX beam (Best RX beam amongst the multiple RX beams used by paging receiver to receive the transmissions from paging transmitter) wherein the best RX beam is the RX beam which was used by paging receiver to successfully receive the SCH/BCH transmission from paging transmitter. Paging receiver determines the paging channel to be received and decoded amongst the plurality of paging channel transmitted by the paging transmitter (plurality of paging channels are transmitted using multiple TX beams) wherein the Paging receiver (PR) determines this using the determined best TX beam. Paging receiver receives & decodes the determined paging channel in the paging available interval using the determined best RX beam amongst the plurality of RX beams supported by paging receiver. Note that If paging receiver fails to decode the determined paging channel then it may decode other paging channel corresponding to other TX beams sequentially). In one exemplary embodiment, suppose beam 0 is the best TX beam determined by paging receiver based on reception of SCH/BCH transmissions. Paging receiver first decodes paging channel corresponding to beam 0 using best RX beam. If it fails to decode paging channel it decodes paging channel corresponding to beam 1 and so on. Alternatively, the paging receiver may decode all the TX beams corresponding to the paging channel using the best RX beam.

Figure 5:
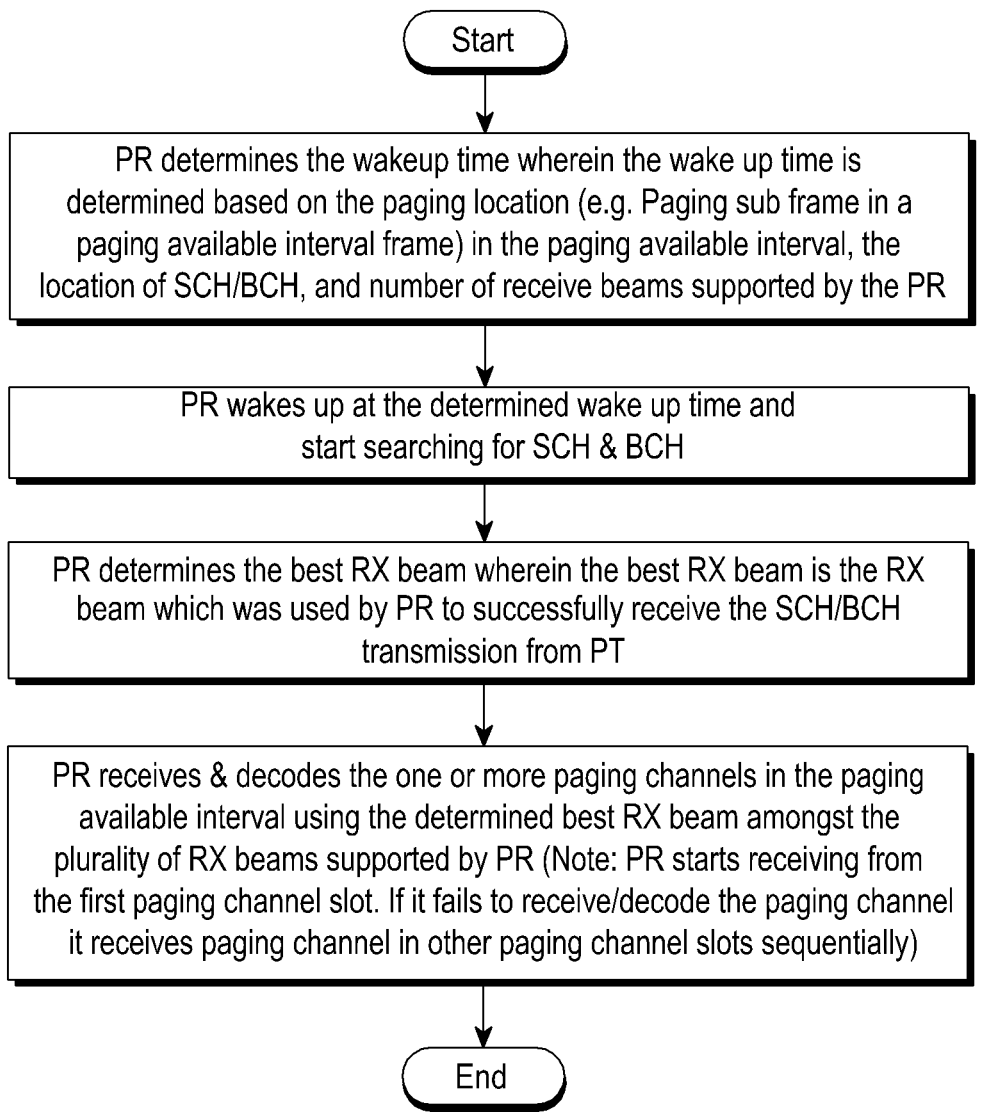
FIG. 5 illustrates a flow diagram of a method of receiving paging information by paging receiver, according to another embodiment.

FIG. 5 illustrates a flow diagram of a method of receiving paging information by paging receiver (PR), according to another embodiment. The paging receiver determines the best RX beam (Best RX beam amongst the multiple RX beams used by paging receiver to receive the transmissions from paging transmitter) wherein the best RX beam is the RX beam which was used by paging receiver to successfully receive the SCH/BCH transmission from paging transmitter (PT). Paging receiver receives & decodes the one or more paging channels in the paging available interval using the determined best RX beam amongst the plurality of RX beams supported by paging receiver (Note: paging receiver starts receiving from the first paging channel slot. If it fails to receive/decode the paging channel it receives paging channel in other paging channel slots sequentially). In this case paging receiver does not care about the best TX beam used to receive the SCHBCH transmissions.

Figure 6:
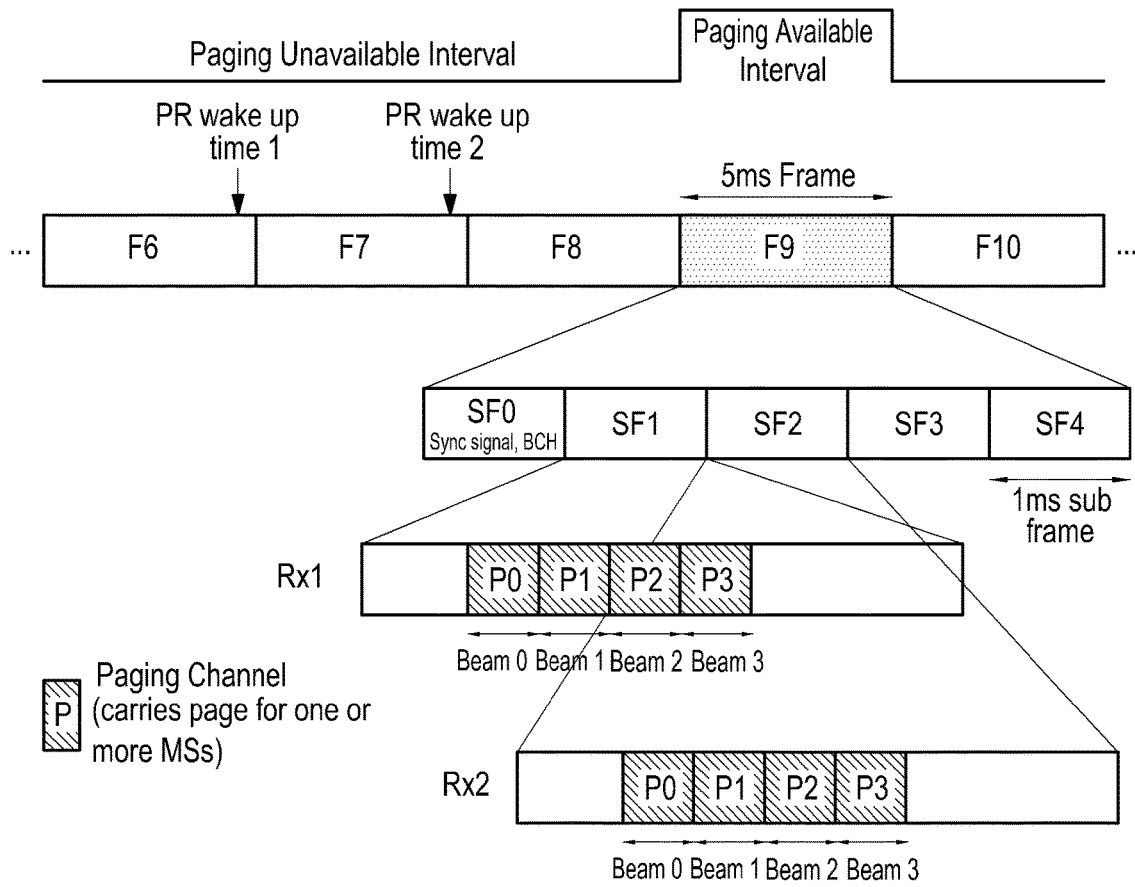
FIG. 6 illustrates a schematic diagram depicting transmission and reception of paging information on a paging channel using 'N' transmitting (Tx) beams and repeated 'P' times in paging available interval, according to another embodiment.

FIG. 6 illustrates a schematic diagram depicting transmission and reception of paging information on a paging channel using 'N' transmitting (TX) beams and repeated 'P' times in paging available interval, according to another embodiment.

According to one embodiment of the Paging Channel Transmission, the paging channel carrying paging information is transmitted using 'N' transmitting (TX) beams and repeated 'P' times in the paging available interval. The paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The number of repetition 'P' is equal to number of RX beams which means that set of transmissions using 'N' TX beams is repeated 'P' times. The repetition of TX beams may be in same paging SF or in different paging SF. The number of repetition may be fixed for all paging receivers (PR) or it can be different for different paging receivers. There may be different group of paging receivers in network with different RX beamforming capability. Some may have two RX beams while others may have four RX beams. Based on paging receivers capability the network may group paging receivers in different groups and each group may be paged in different times with different repetition of TX beams. Paging receiver indicates its capability of RX beamforming to network when it attaches with network. This information can be used by the network to form paging receiver groups and apply different repetition for paging channel transmissions.

The paging available interval can be of one frame duration wherein each frame comprises of multiple sub frames. The number of paging channel TX beams in this embodiment of the present disclosure may or may not be equal to number of SCH/BCH beams. Paging channel sub frame for paging may be fixed or predefined i.e. paging channel for all paging receivers in a paging available interval is fixed. For example SF0 or SF1 or SF2 or SF3 or SF4 can be fixed for paging wherein the repetition is in same SF. Alternately two sub frames, (SF0,SF1) or (SF1,SF2) or (SF2,SF3) or (SF3, SF4) can be fixed for paging wherein the repetition is in different SF and two RX beams are used by paging receiver. Similarly other combinations are possible. Alternately paging channel SF in paging available interval can be specific to paging receiver. BCH may indicate if paging is there in PAI or not. BCH of PAI Frame and up to P frames before PAI should include paging indicator for paging in PAI Frame. The resources for paging channel transmissions in paging SF may be fixed or specified by a control channel.

According to one embodiment of the Paging Channel Reception, paging receiver determines the wake up time before the paging available interval. The number of frames paging receiver wakes up early before the paging available interval depends on the location of paging channel in paging available interval, the location of SCH/BCH and the number of receive beams used by paging receiver to receive the transmissions from paging transmitter (PT). As illustrated in FIG. 6, the paging receiver uses two RX beams for receiving the transmissions from paging transmitter. If the paging is transmitted in SF0 of paging available interval then paging receiver wakes up at paging receiver (PR) wake up time 1 or paging receiver wake up time 2 depending on whether the paging is located before the SCH/BCH transmissions in SF0 or paging is located after the SCH/BCH transmissions in SF0. If the paging is located before the SCH/BCH transmissions in SF0 of frame F9 then paging receiver wakes up at paging receiver wake up time 1 (i.e. before the frame F7). If the paging is located after the SCH/BCH transmissions in SF0 of frame F9 then paging receiver wakes up at paging receiver wake up time 2 (i.e. before the frame F8). If the paging is located in any sub frames from SF1 to SF4 of frame F9 then UE wakes up at paging receiver wake up time 2 (i.e. before the frame F8). The paging receiver wakes up at the determined wake up time and start searching for SCH/BCH. The paging receiver then performs the DL synchronization using the received SCH/BCH.

Figure 7:
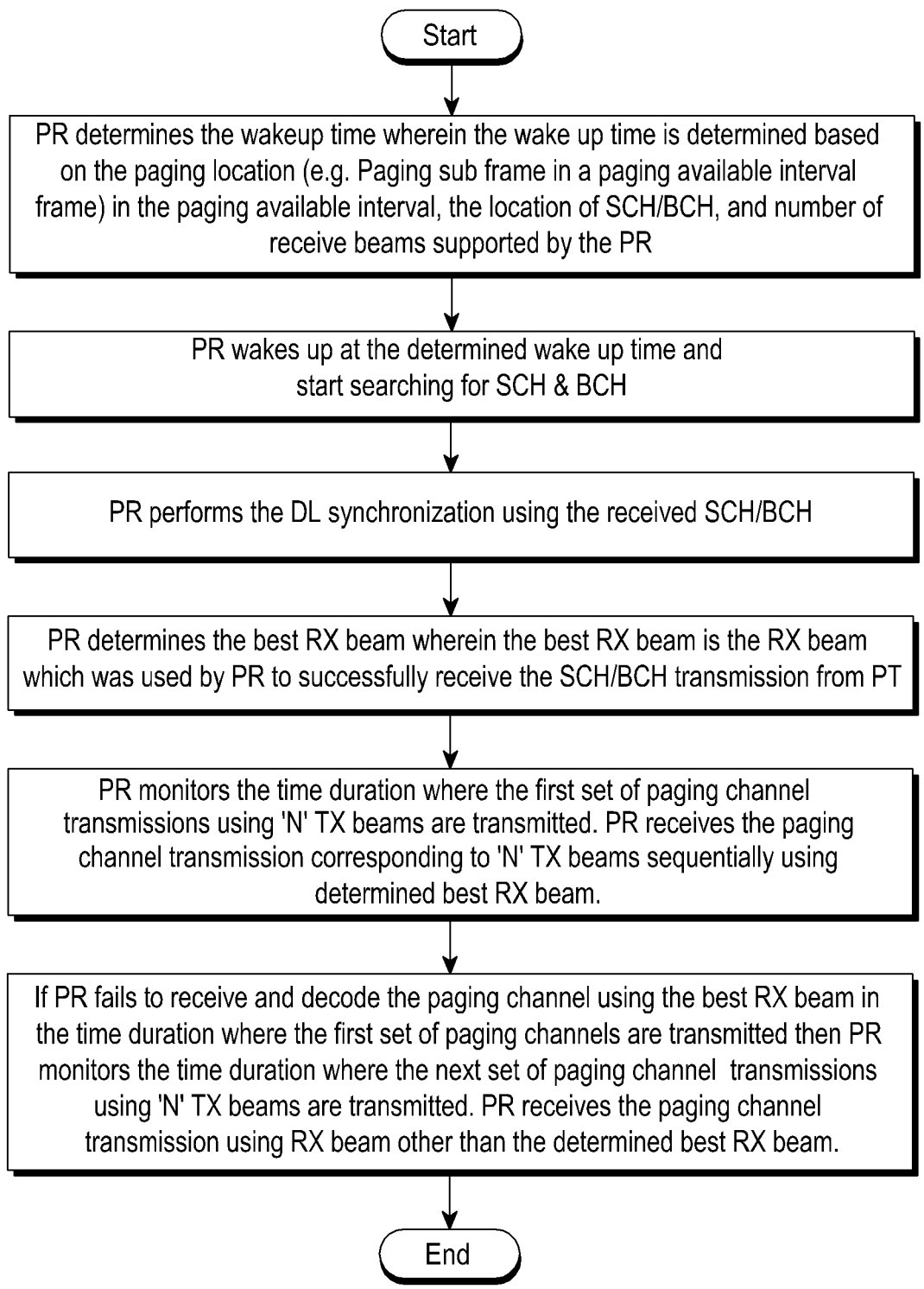
FIG. 7 illustrates a flow diagram of a method of receiving paging information by paging receiver, according to yet another embodiment.

FIG. 7 illustrates a flow diagram of a method of receiving paging information by paging receiver, according to yet another embodiment. Paging receiver determines the best RX beam (Best RX beam amongst the multiple RX beams used by paging receiver (PR) to receive the transmissions from paging transmitter) wherein the best RX beam is the RX beam which was used by paging receiver to successfully receive the SCH/BCH transmission from paging transmitter (PT). Paging receiver then monitors the time duration where the first set of paging channel transmissions using 'N' TX beams are transmitted. The paging receiver receives the paging channel transmissions corresponding to 'N' TX beams sequentially using determined best RX beam. If paging receiver fails to receive and decode the paging channel using the best RX beam in the time duration where the first set of paging channels are transmitted then paging receiver monitors the time duration where the next set of paging channel transmissions using 'N' TX beams are transmitted. Paging receiver receives the paging channel transmission using RX beam other than the determined best RX beam. Paging receiver receives the paging channel transmissions corresponding to 'N' TX beams sequentially using the next RX beam.

Figure 8:
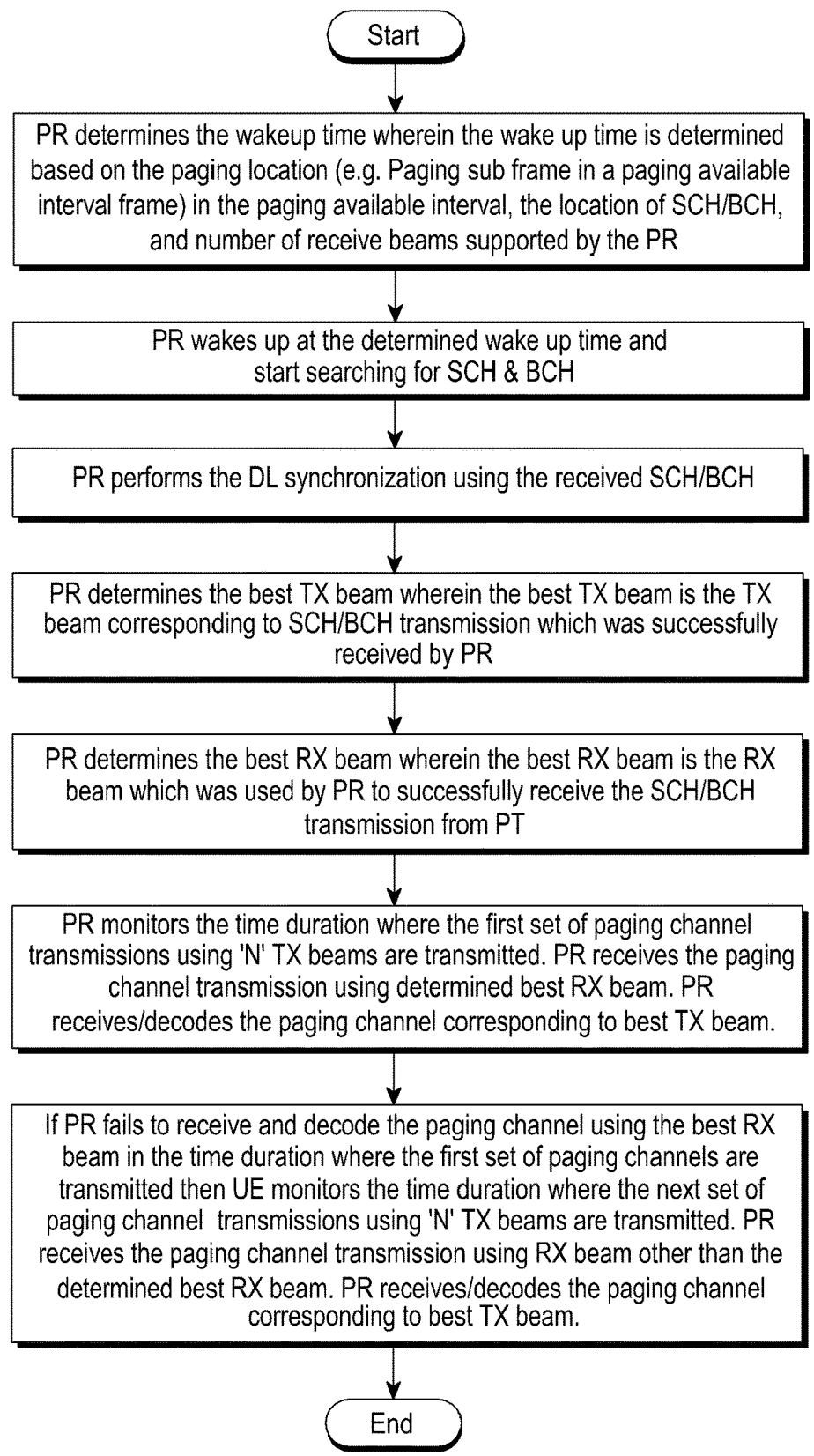
FIG. 8 illustrates a flow diagram of a method of receiving paging information by paging receiver, according to another embodiment.

FIG. 8 illustrates a flow diagram of a method of receiving paging information by paging receiver (PR), according to another embodiment. The Paging receiver determines the best TX beam wherein the best TX beam is the TX beam corresponding to SCH/BCH transmission which was successfully received by paging receiver paging receiver determines the best RX beam (Best RX beam amongst the multiple RX beams used by paging receiver to receive the transmissions from paging transmitter) wherein the best RX beam is the RX beam which was used by paging receiver to successfully receive the SCH/BCH transmission from paging transmitter (PT). Paging receiver then monitors the time duration where the first set of paging channel transmissions using 'N' TX beams are transmitted. Paging receiver receives/decodes the paging channel corresponding to best TX beam amongst the plurality of paging channel transmissions. In one method, if paging receiver fails to decode paging channel corresponding to best TX beam it receive/decode other paging channel transmissions corresponding to TX beam other than determined best TX beam. In another method, if paging receiver fails to decode paging channel corresponding to best TX beam it does not receive/decode other paging channel transmissions corresponding to TX beam other than determined best TX beam. If paging receiver (PR) fails to receive and decode the paging channel using the best RX beam in the time duration where the first set of paging channels are transmitted then paging receiver monitors the time duration where the next set of paging channel transmissions using 'N' TX beams are transmitted. Paging receiver receives the paging channel transmission using RX beam other than the determined best RX beam. Paging receiver receives/decodes the paging channel corresponding to best TX beam amongst the plurality of paging channel transmissions. In one exemplary embodiment, if paging receiver fails to decode paging channel corresponding to best TX beam it receive/decode other paging channel transmissions corresponding to TX beam other than determined best TX beam. In another exemplary embodiment, if paging receiver fails to decode paging channel corresponding to best TX beam it does not receive/decode other paging channel transmissions corresponding to TX beam other than determined best TX beam.

Figure 9:
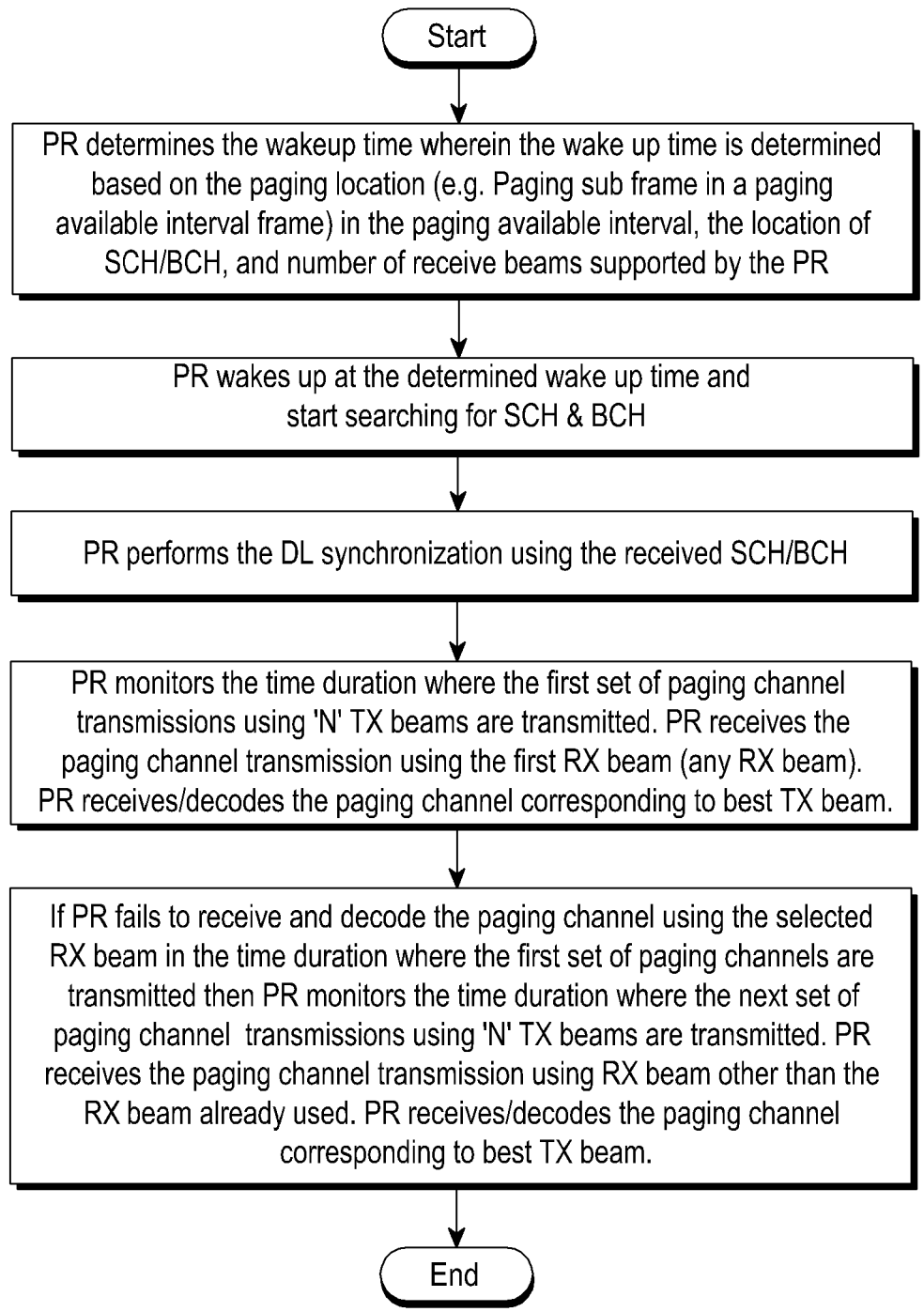
FIG. 9 illustrates a flow diagram of a method of receiving paging information by paging receiver, according to another embodiment.

FIG. 9 illustrates a flow diagram of a method of receiving paging information by paging receiver, according to another embodiment. The paging receiver (PR) does not determine the best RX beam or best TX beam. Paging receiver monitors the time duration where the first set of paging channel transmissions using 'N' TX beams are transmitted. Paging receiver receives the paging channel transmission using the first RX beam (any RX beam). If paging receiver fails to receive and decode the paging channel using the selected RX beam in the time duration where the first set of paging channels are transmitted then paging receiver monitors the time duration where the next set of paging channel transmissions using 'N' TX beams are transmitted. Paging receiver receives the paging channel transmission using RX beam other than the RX beam already used.

Figure 10:
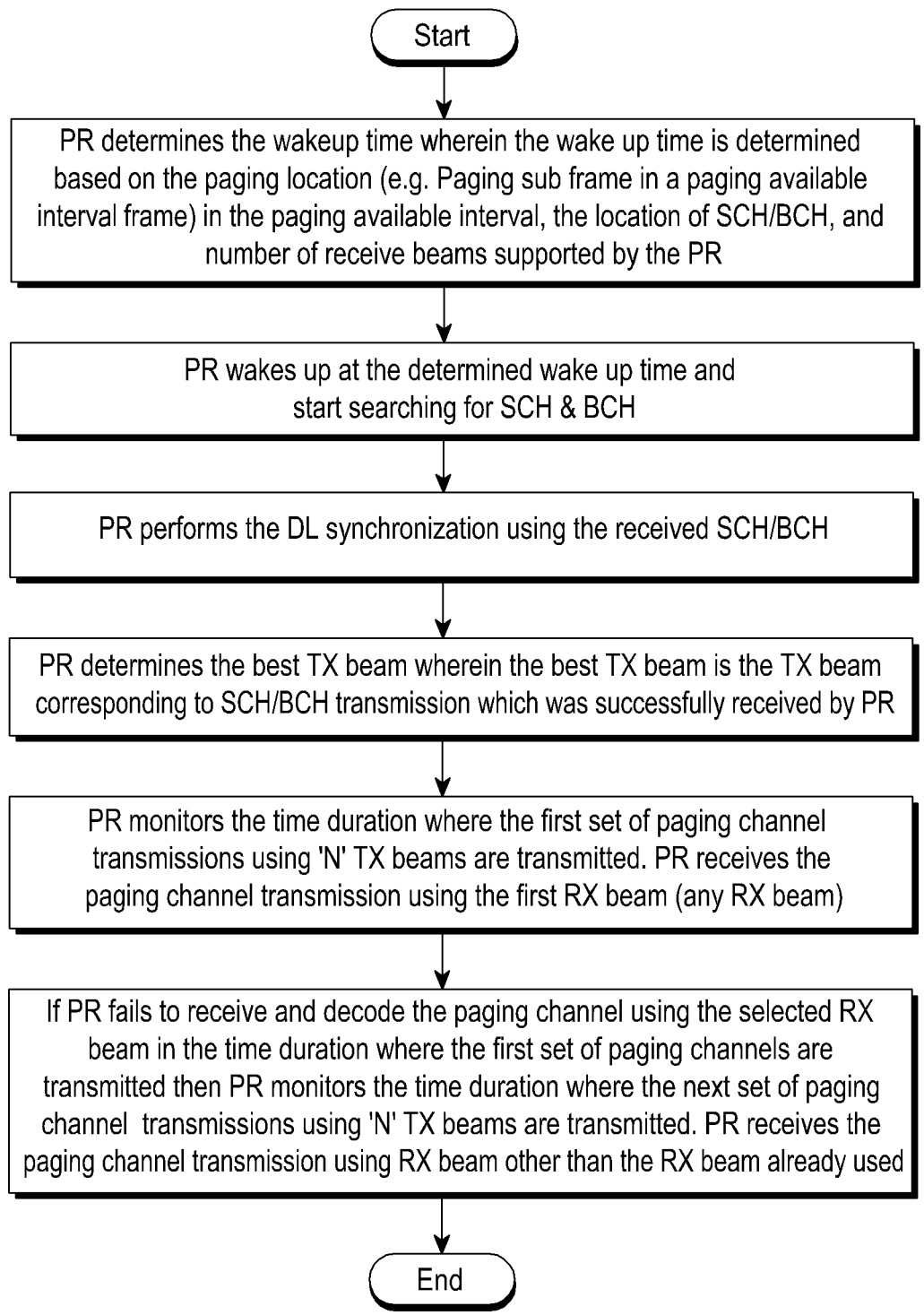
FIG. 10 illustrates a flow diagram of a method of receiving paging information by paging receiver, according to another embodiment.

FIG. 10 illustrates a flow diagram of a method of receiving paging information by a paging receiver (PR), according to another embodiment. The Paging receiver determines the best TX beam wherein the best TX beam is the TX beam corresponding to SCH/BCH transmission which was successfully received by paging receiver. Paging receiver monitors the time duration where the first set of paging channel transmissions using 'N' TX beams are transmitted. Paging receiver receives the paging channel transmission using the first RX beam (any RX beam). Paging receiver receives/decodes the paging channel corresponding to best TX beam. In an exemplary embodiment, if paging receiver fails to decode paging channel corresponding to best TX beam it receive/decode other paging channel transmissions corresponding to TX beam other than determined best TX beam. In another exemplary embodiment, if paging receiver fails to decode paging channel corresponding to best TX beam it does not receive/decode other paging channel transmissions corresponding to TX beam other than determined best TX beam. If paging receiver fails to receive and decode the paging channel using the selected RX beam in the time duration where the first set of paging channels are transmitted then paging receiver monitors the time duration where the next set of paging channel transmissions using 'N' TX beams are transmitted in the Paging Available Interval. Paging receiver (PR) receives the paging channel transmission using RX beam other than the RX beam already used. Paging receiver receives/decodes the paging channel corresponding to best TX beam. In an exemplary embodiment, if paging receiver fails to decode paging channel corresponding to best TX beam it receive/decode other paging channel transmissions corresponding to TX beam other than determined best TX beam. In another exemplary embodiment, if paging receiver fails to decode paging channel corresponding to best TX beam it does not receive/decode other paging channel transmissions corresponding to TX beam other than determined best TX beam.

Figure 11:
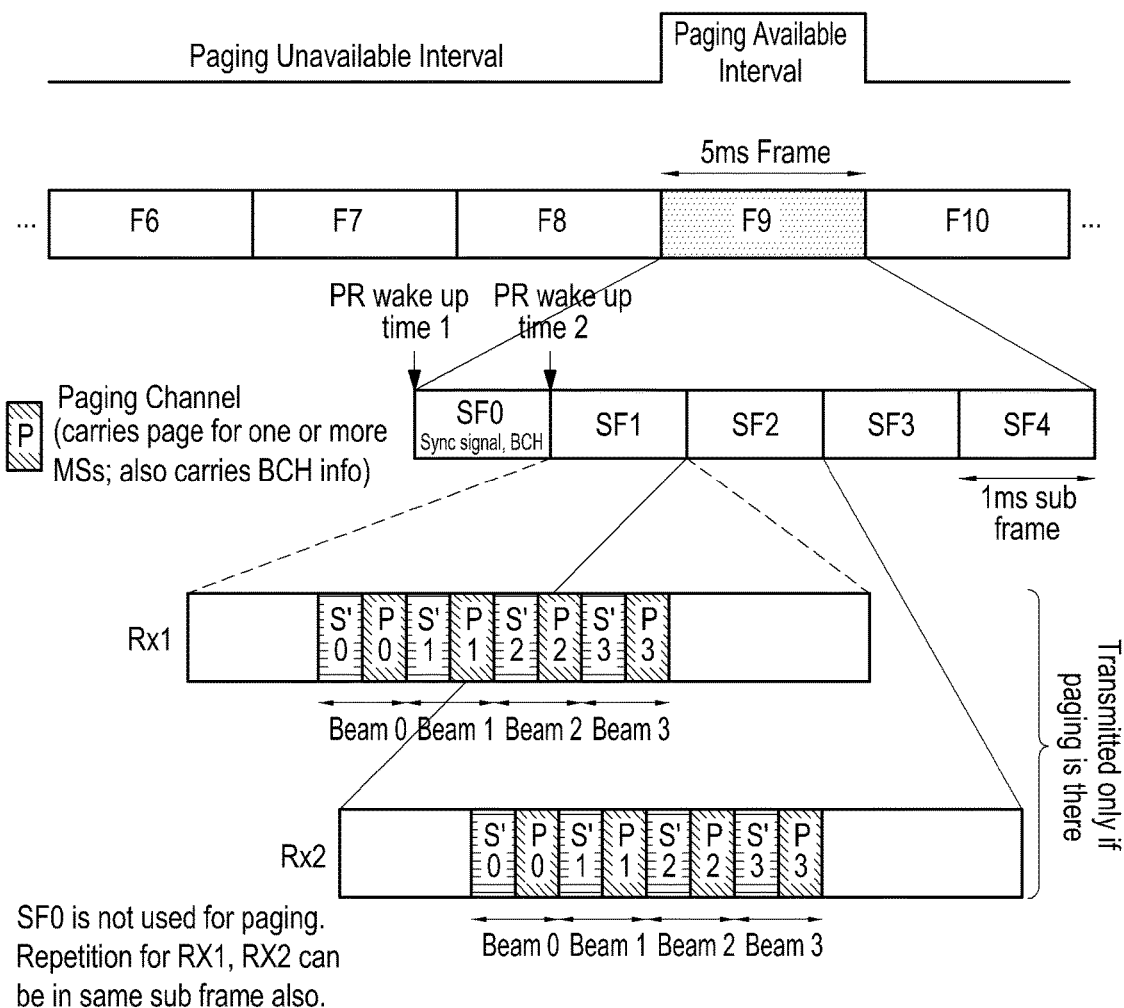
FIG. 11 illustrates a schematic diagram depicting transmission and reception of paging information on a paging channel using 'N' transmitting (TX) beams and repeated 'P' times in paging available interval, according to yet another embodiment.

FIG. 11 illustrates a schematic diagram depicting transmission and reception of paging information on a paging channel using 'N' transmitting (TX) beams and repeated 'P' times in paging available interval, according to yet another embodiment.

According to one embodiment of the Paging Channel Transmission, the paging channel carrying paging information is transmitted using 'N' transmitting (TX) beams and repeated 'P' times in the paging available interval. The paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The number of repetition 'P' is equal to number of RX beams which means that set of transmissions using 'N' TX beams is repeated 'P' times. The repetition of TX beams may be in same paging SF or in different paging SF. The number of repetition may be fixed for all paging receivers or it can be different for different paging receivers. There may be different group of paging receivers in network with different RX beamforming capability. For example, some may have two RX beams while others may have four RX beams. Based on paging receivers capability the network may group paging receivers in different groups and each group may be paged in different times with different repetition of TX beams. Paging receiver (PR) indicates its capability of RX beamforming to network when it attaches with the network. This information can be used by the network to form paging receiver groups and apply different repetition for paging channel transmissions. The number of paging channel TX beams in this embodiment of the disclosure may or may not be equal to number of SCH/BCH beams.

In this embodiment the paging channel not only carries the paging information but it also carries the information transmitted in the BCH. A paging synchronization channel (carrying synchronization signal) is also transmitted before each paging channel transmission using the same beam as the beam used for paging channel transmission. Sequence used for synchronization signal in paging synchronization channel preceding the paging channel is different from sequence used for synchronization signal preceding the BCH. Paging synchronization channel in paging channel sub frame is transmitted only if paging is present. If there is no paging then paging synchronization channel and paging channel is not transmitted. Paging synchronization channel preceding the paging channel is used for DL synchronization as well as to detect paging.

The resources for paging channel transmissions in paging SF may be fixed or indicated by control channel. If the resources are indicated using the control channel then after receiving the synchronization signal transmitted before paging channel, paging receiver (PR) will receive control channel and then decode the paging channel. In this case synchronization signal, control channel and paging channel are transmitted one after another using the same beam and repeated for multiple TX beams.

Figure 12:
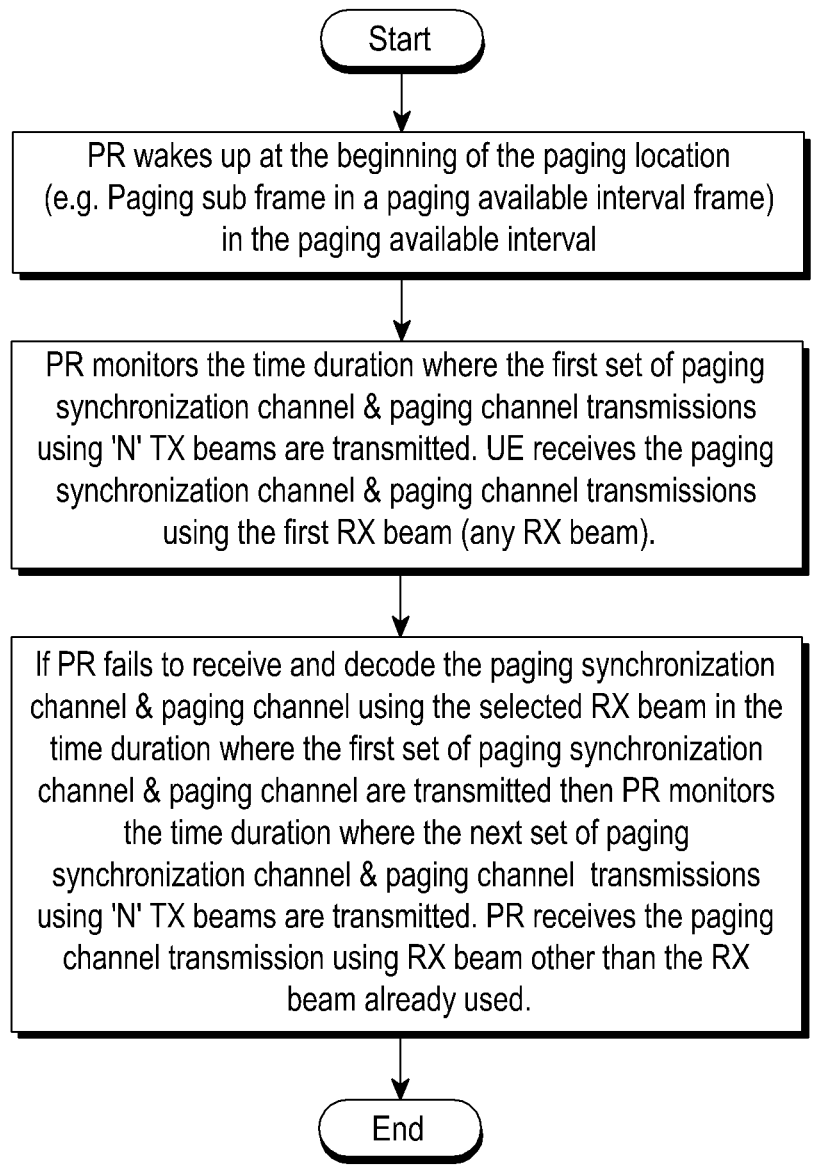
FIG. 12 illustrates a flow diagram of a method of receiving paging information by paging receiver, according to yet another embodiment.

FIG. 12 illustrates a flow diagram of a method of receiving paging information by paging receiver (PR), according to yet another embodiment. The paging receiver needs to wake up only at the SF carrying the paging. The paging receiver does not need to receive and decode SCH/BCH for receiving paging. In the exemplary embodiment as illustrated in FIG. 12, paging receiver wakes up at the beginning of the paging location (e.g. Paging sub frame in a paging available interval frame) in the paging available interval. The paging receiver monitors the time duration where the first set of paging synchronization channel & paging channel transmissions using 'N' TX beams are transmitted. The paging receiver receives the paging synchronization channel & paging channel transmissions using the first RX beam (any RX beam). If paging receiver is able to receive the paging synchronization signal, it will decode the paging channel following the paging synchronization signal and receive the paging and BCH information. If paging receiver fails to receive and decode the paging synchronization channel & paging channel using the selected RX beam in the time duration where the first set of paging synchronization channel & paging channel are transmitted then paging receiver monitors the time duration where the next set of paging synchronization channel & paging channel transmissions using 'N' TX beams are transmitted. The paging receiver receives the paging channel transmission using RX beam other than the RX beam already used.

In this embodiment paging receiver does not receive and decodes the SCH/BCH in every paging available interval. As a result paging receiver will not have information about the paging area change in case paging is not there in paging available interval as the paging area change information is present in the BCH. In order to solve this problem, the present embodiment performs a timer based location search wherein the paging receiver receives and decodes the SCH/BCH only if the location search timer is expired before the paging available interval. Location search timer is reset every time paging area information is read from BCH or BCH information carried in the paging channel. If the location search timer is not expired than paging receiver will not receive and decode the SCH/BCH in the paging available interval. It will only receive and decode the paging synchronization channel transmitted before paging channel and the paging channel.

Figure 13:
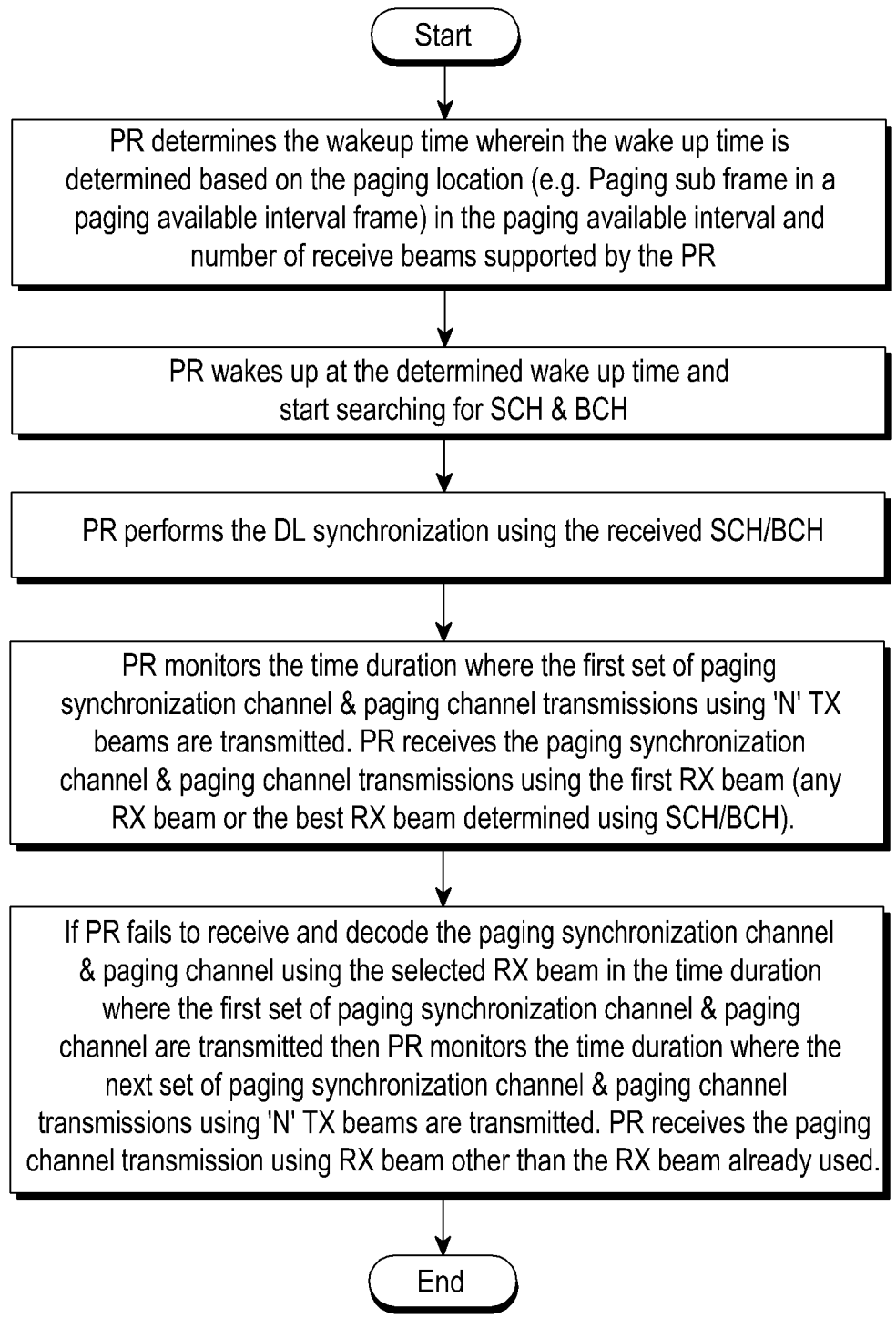
FIG. 13 illustrates a flow diagram of a method of receiving paging information by paging receiver, according to yet another embodiment.

FIG. 13 illustrates a flow diagram of a method of receiving paging information by paging receiver, according to yet another embodiment.

Location Update: In this exemplary embodiment, wherein the paging receiver (PR) monitors the SCH/BCH in the paging available interval, the paging receiver procedure is executed only when the location search timer is expired before the paging available interval. Paging receiver determines the wakeup time wherein the wake up time is determined based on the paging location (e.g. Paging sub frame in a paging available interval frame) in the paging available interval and number of receive beams supported by the paging receiver. Paging receiver wakes up at the determined wake up time and start searching for SCH & BCH. Paging receiver performs the DL synchronization using the received SCH/BCH. Paging receiver monitors the time duration where the first set of paging synchronization channel & paging channel transmissions using 'N' TX beams are transmitted. Paging receiver receives the paging synchronization channel & paging channel transmissions using the first RX beam (any RX beam or the best RX beam determined using SCH/BCH). If paging receiver fails to receive and decode the paging synchronization channel & paging channel using the selected RX beam in the time duration where the first set of paging synchronization channel & paging channel are transmitted then paging receiver monitors the time duration where the next set of paging synchronization channel & paging channel transmissions using 'N' TX beams are transmitted. Paging receiver receives the paging channel transmission using RX beam other than the RX beam already used.

Paging receiver may also execute the procedure as explained in FIGS. 7, 8, 9 &10 in case the paging receiver monitors the SCH/BCH in the paging available interval wherein the paging receiver monitors the SCH/BCH in the paging available interval if the location search timer is expired before the paging available interval.

Figure 14:
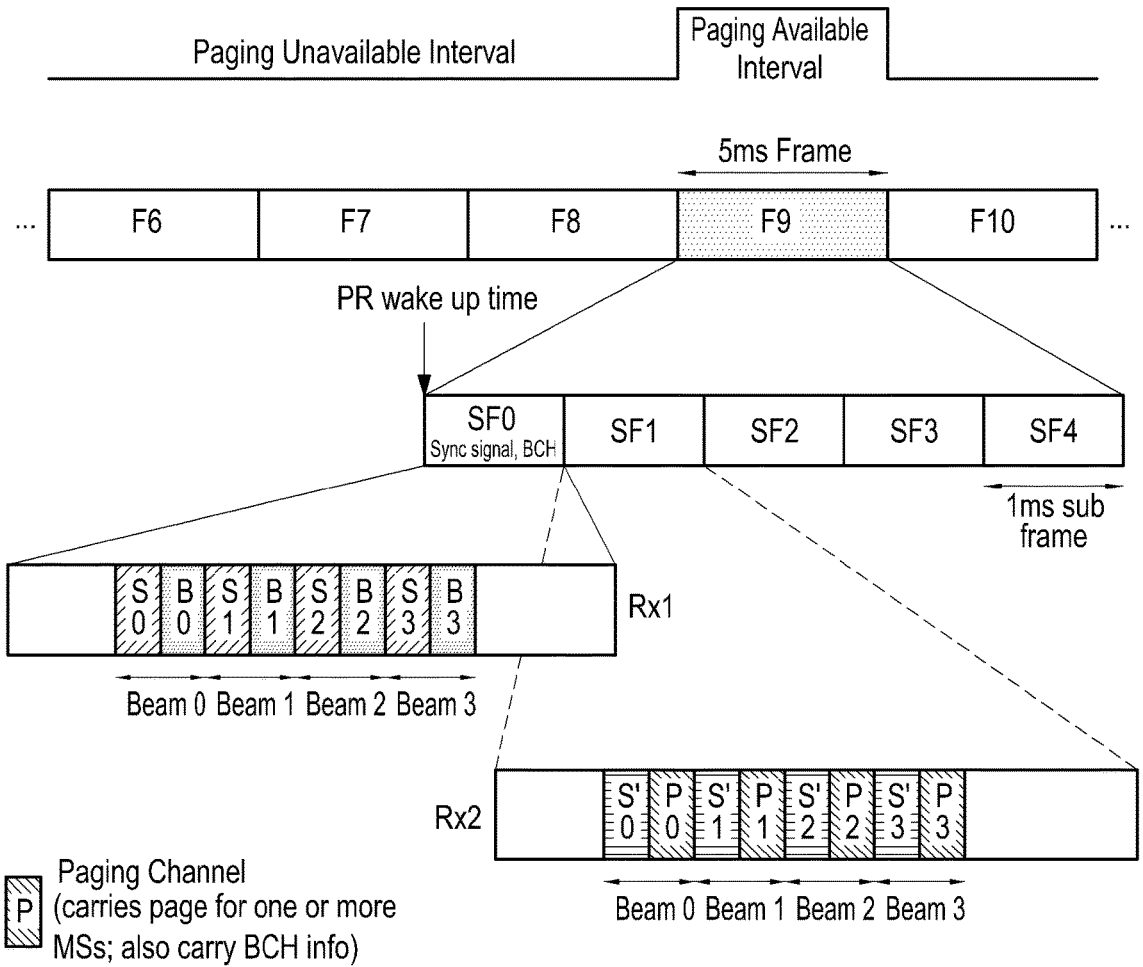
FIG. 14 illustrates a schematic diagram depicting transmission and reception of paging information on a paging channel using 'N' transmitting (Tx) beams, according to another embodiment.
Figure 15:
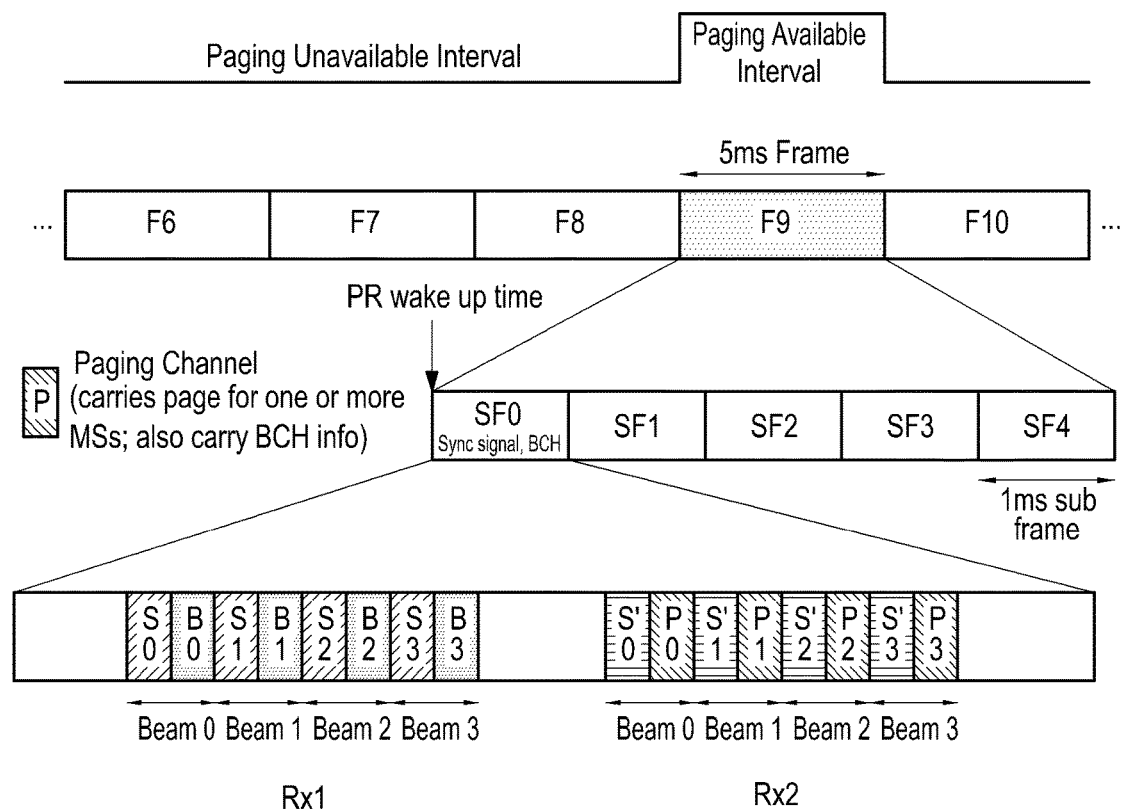
FIG. 15 illustrates a schematic diagram depicting transmission and reception of paging information on a paging channel using 'N' transmitting (Tx) beams, according to another embodiment.

FIG. 14 & FIG. 15 illustrate a schematic diagram depicting transmission and reception of paging information on a paging channel using 'N' transmitting (TX) beams, according to another embodiment.

According to one embodiment of the Paging Channel Transmission, the paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The paging channel transmission using 'N' TX beams is repeated for 'P−1' receives (RX) beams in paging receiver where 'P' is the number of receive beams in paging receiver (PR). In a beam-formed system paging receiver typically receives the transmission using multiple RX beams wherein the paging receiver uses one RX beam to receive one set of 'N' TX beams and same is repeated for each RX beam. The number of paging channel TX beams in this embodiment of the present disclosure may or may not be equal to number of SCH/BCH beams.

In this embodiment, the paging channel not only carries the paging information but it also carries the information transmitted in the BCH. A paging synchronization channel (carrying synchronization signal) is also transmitted before each paging channel transmission using the same beam as the beam used for paging channel transmission. Sequence used for synchronization signal in paging synchronization channel preceding the paging channel is different from sequence used for synchronization signal preceding the BCH. Paging synchronization channel in paging channel sub frame is transmitted only if paging is there. If there is no paging then paging synchronization channel and paging channel is not transmitted. Paging synchronization channel preceding the paging channel is used for DL synchronization as well as to detect paging.

The resources for paging channel transmissions in paging SF may be fixed or indicated by control channel. If the resources are indicated using the control channel then after receiving the synchronization signal transmitted before paging channel, paging receiver will receive control channel and then decode the paging channel. In this case paging synchronization signal, control channel and paging channel are transmitted one after another using the same beam and repeated for multiple TX beams.

Figure 16:
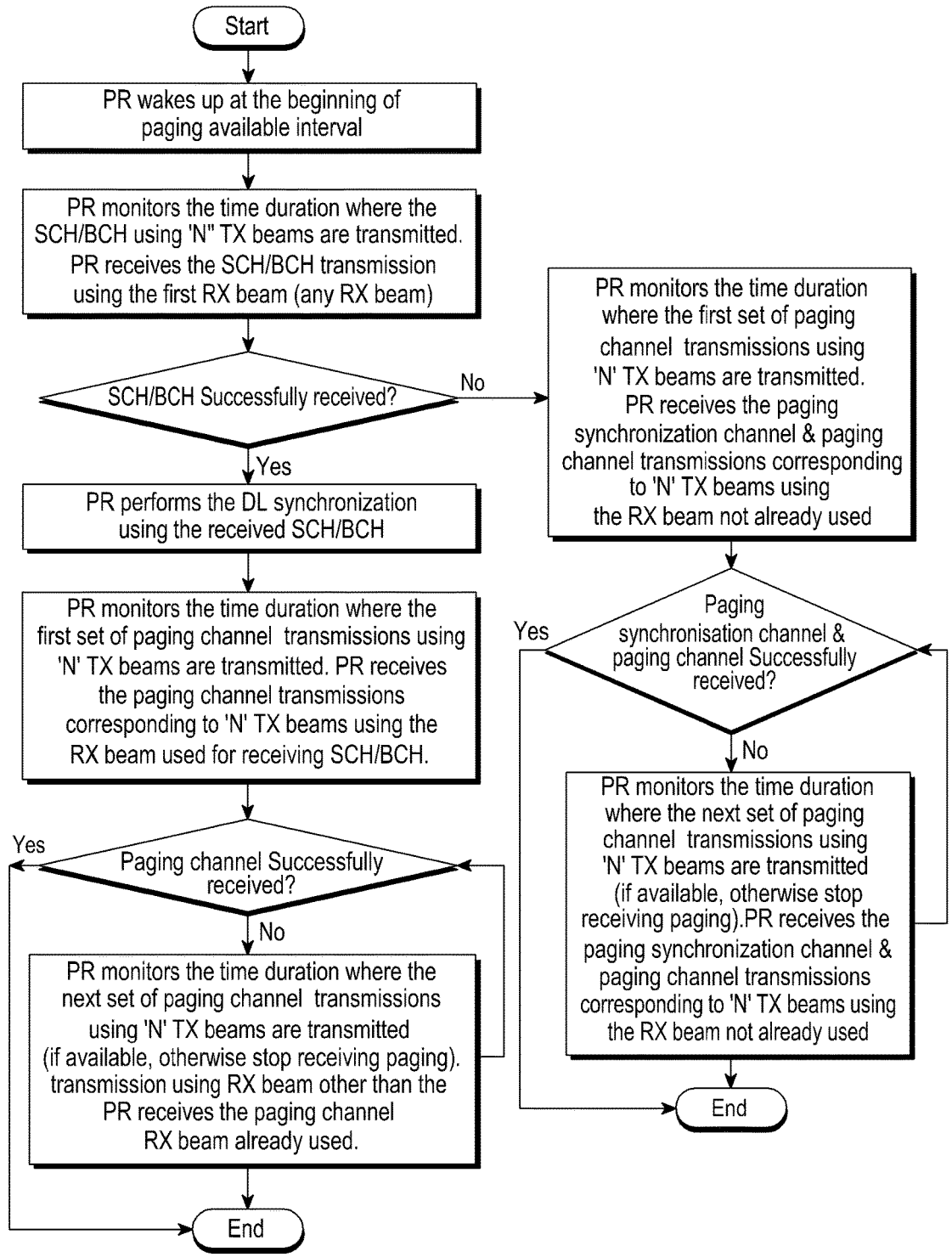
FIG. 16 illustrates a flow diagram of a method of receiving paging information by paging receiver, according to another embodiment.

FIG. 16 illustrates a flow diagram of a method of receiving paging information by paging receiver (PR), according to another embodiment.

According to one embodiment of the Paging Channel Reception, the paging receiver wakes up only at the beginning of paging available interval. Paging receiver monitors the time duration where the SCH/BCH using 'N" TX beams are transmitted. Paging receiver receives the SCH/BCH transmission using the first RX beam (any RX beam).

If the SCH/BCH is successfully received paging receiver performs the DL synchronization using the received SCH/BCH. Paging receiver monitors the time duration where the first set of paging channel transmissions using 'N' TX beams are transmitted. Paging receiver receives the paging channel transmissions corresponding to 'N' TX beams using the RX beam used for receiving SCH/BCH. If the Paging channel is not successfully received then paging receiver monitors the time duration where the next set of paging channel transmissions using 'N' TX beams are transmitted (if available, otherwise stop receiving paging). Paging receiver receives the paging channel transmission using RX beam other than the RX beam already used. Paging receiver may receive paging channel corresponding to the TX beam of SCH/BCH reception.

If the SCH/BCH is not successfully received, the paging receiver monitors the time duration where the first set of paging channel transmissions using 'N' TX beams are transmitted. Paging receiver receives the paging synchronization channel & paging channel transmissions corresponding to 'N' TX beams using the RX beam not already used. If the Paging synchronization channel & paging channel is not successfully received then paging receiver monitors the time duration where the next set of paging channel transmissions using 'N' TX beams are transmitted (if available, otherwise stop receiving paging). Paging receiver receives the paging synchronization channel & paging channel transmissions corresponding to 'N' TX beams using the RX beam not already used.

Location Update: In this embodiment paging receiver does not receive and decodes the SCH/BCH in every paging available interval. As a result paging receiver will not have information about the paging area change in case paging is not there in paging available interval as the paging area change information is present in the BCH. In order to overcome this problem, the embodiment provides a timer based location search wherein the paging receiver receives and decodes the SCH/BCH only if the location search timer is expired before the paging available interval. Location search timer is reset every time paging area information is read from BCH or BCH information carried in the paging channel. If the location search timer is not expired than paging receiver will not receive and decode the SCH/BCH in the paging available interval. It will only receive and decode the paging synchronization channel transmitted before paging channel and the paging channel.

Figure 17:
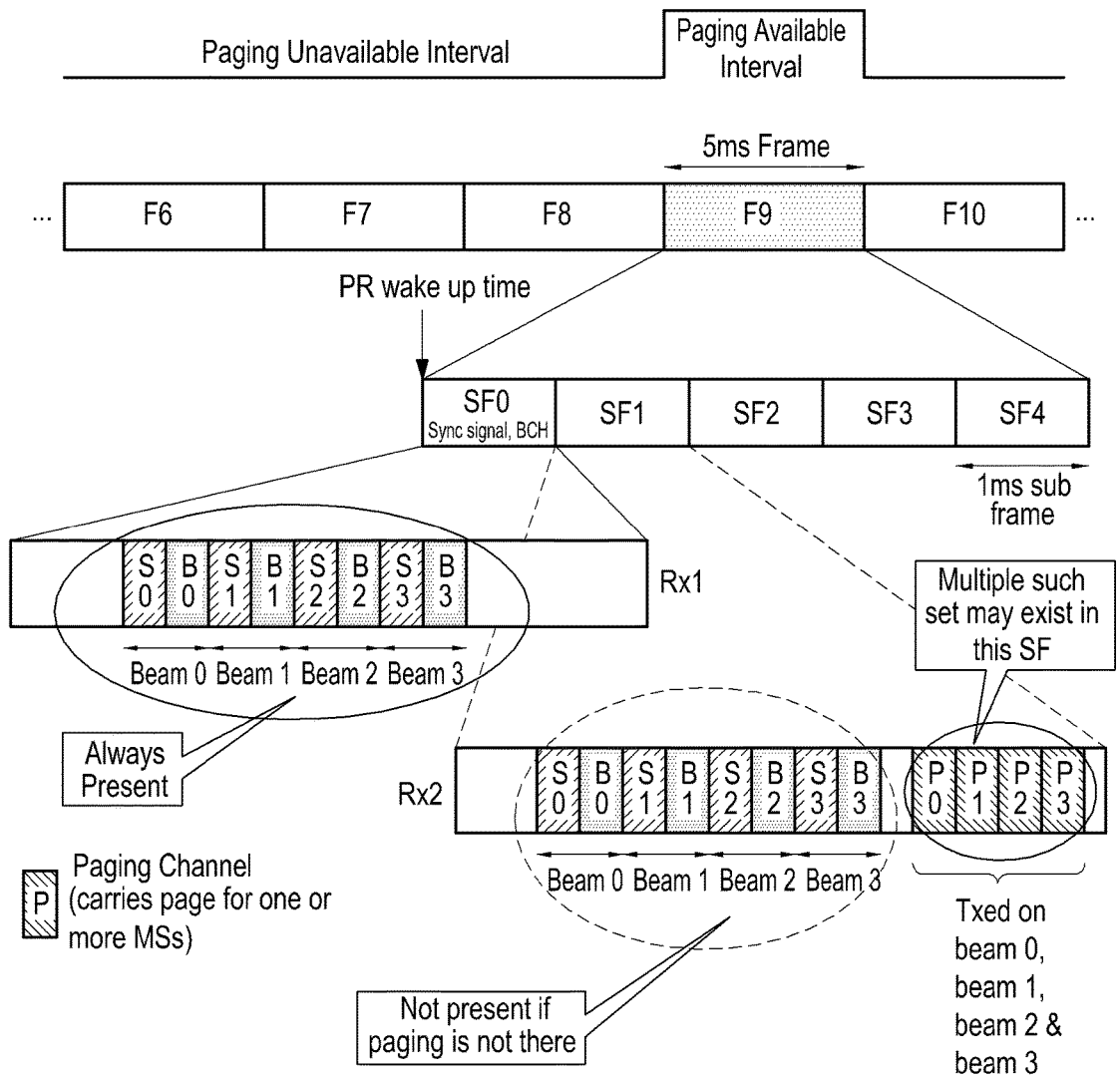
FIG. 17 illustrates a schematic diagram depicting transmission and reception of paging information on a paging channel using 'N' transmitting (TX) beams in a paging available interval, according to another embodiment.

FIG. 17 illustrates a schematic diagram depicting transmission and reception of paging information on a paging channel using 'N' transmitting (TX) beams in a paging available interval, according to another embodiment.

According to an embodiment of the Paging Channel Transmission, the paging channel carrying paging information is transmitted using 'N' transmitting (TX) beams in the paging available interval. The paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The paging channel transmission using 'N' TX beams is not repeated for multiple receive (RX) beams in paging receiver (PR) which means that only one set of 'N' TX beams is transmitted by paging transmitter (PT). In a beamformed system paging receiver typically receives the transmission using multiple RX beams wherein the paging receiver uses one RX beam to receive one set of 'N' TX beams and same is repeated for each RX beam.

The paging available interval can be of one frame duration wherein each frame comprises of multiple sub frames. Paging channel may be present in one or more SFs of paging available interval wherein the paging channel in different SFs carries different paging information (e.g. Different set of paging receivers may be assigned different SF for paging). The number of paging channel TX beams in this embodiment of the present disclosure is equal to number of synchronization/BCH beams. The order of transmission of TX beams for paging channel is same as order of synchronization/BCH beams. Paging channel sub frame for paging may be fixed (pre-specified) i.e. paging channel for all paging receivers in a paging available interval is fixed. Alternatively paging channel SF in paging available interval can be specific to paging receiver. BCH may indicate if paging is there in PAI or not. BCH of PAI Frame and up to P frames before PAI should include paging indicator for paging in PAI Frame. The resources for paging channel transmissions in paging SF may be fixed or indicated by a control channel.

Figure 18:
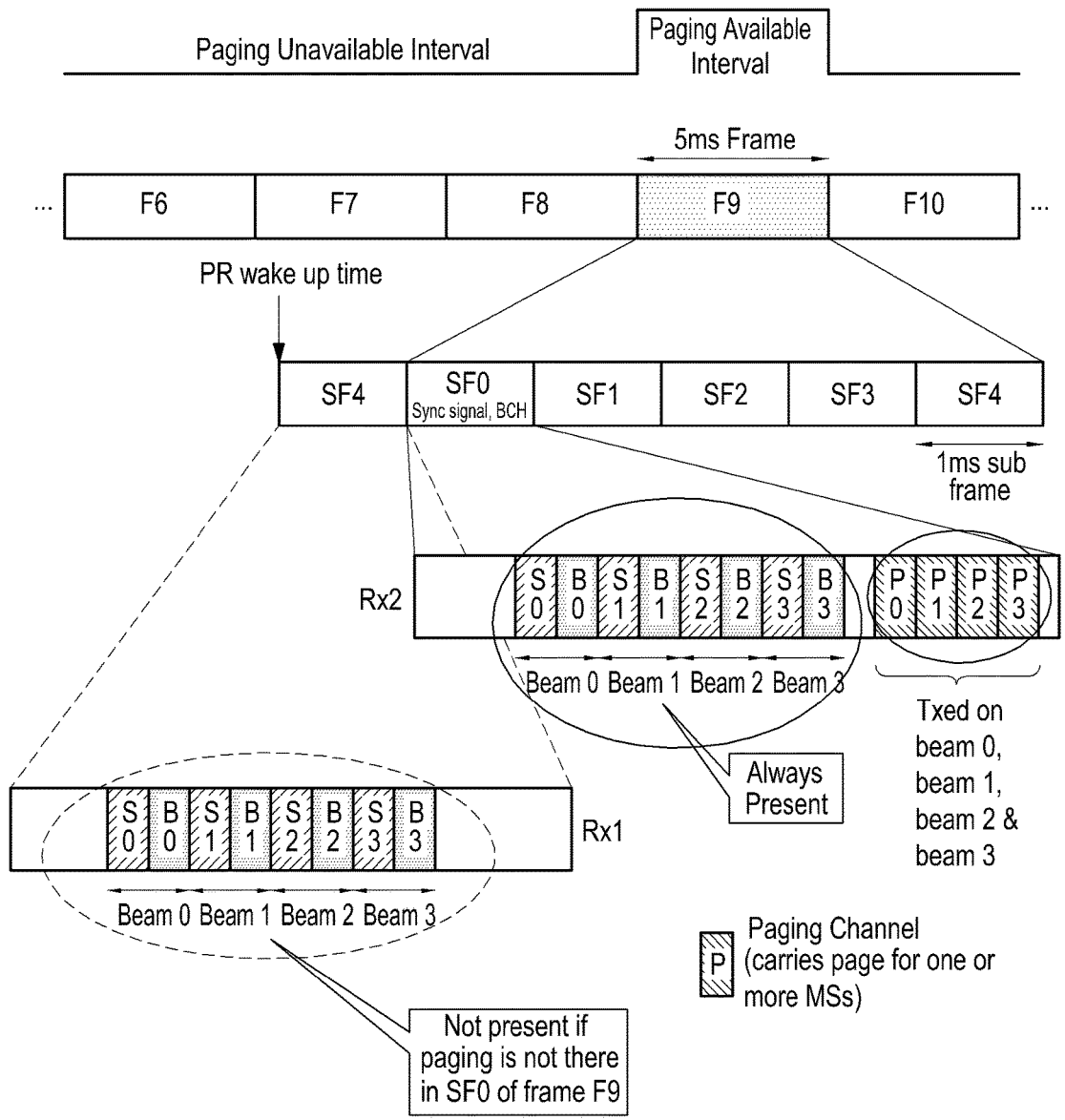
FIG. 18 illustrates another schematic diagram depicting transmission and reception of paging information on a paging channel using 'N' transmitting (TX) beams in a paging available interval, according to another embodiment.

In this embodiment of the present disclosure additional SCH/BCH are transmitted by the paging transmitter. The additional SCH/BCH is transmitted only if paging is there in time durations (paging subframe) meant for paging. The time durations or SFs where additional SCH/BCH are transmitted depends on the location of paging SF in paging available interval and number of receive beams supported by paging receiver. For the case of two receive beams, the additional SCH/BCH is transmitted in paging SF if SCH/BCH is not already present in the paging SF. For example, as illustrated in FIG. 17 if paging SF is other than the SF0 in paging available interval wherein SCH/BCH is transmitted in the SF0 in the system then additional SCH/BCH are transmitted by the paging transmitter (PT) in the paging SF if paging is there in the paging SF. For the case of two receive beams, the additional SCH/BCH is transmitted in SF preceding the paging SF if SCH/BCH is already present in the paging SF. According to an exemplary embodiment as illustrated in FIG. 18, if paging SF is the SF0 in paging available interval wherein SCH/BCH is transmitted in the SF0 in the system then additional SCH/BCH are transmitted by the paging transmitter (PT) in the SF preceding the paging SF if paging is there in the paging SF. For the case of 'P' receive beams, if SCH/BCH is already present in paging SF then additional SCH/BCH are transmitted in those 'P−1' sub frames preceding the paging subframe where SCH/BCH is not normally transmitted. For the case of 'P' receive beams, if SCH/BCH is not already present in paging SF then additional SCH/BCH are transmitted in those 'P' sub frames including & preceding the paging subframe where SCH/BCH is not normally transmitted.

The additional SCH/BCH transmitted because of paging differs from normal SCH/BCH transmission as follows: In one exemplary embodiment, the preamble used for both the SCH is same but sub frame ID in BCH of normal BCH transmission and sub frame ID in BCH transmission is different. Sub frame ID in BCH will be the ID of the sub frame in which the BCH is transmitted. For example, if the normal SCH/BCH are transmitted in SF0 of every frame and additional SCH/BCH because of paging are transmitted in SF1 then BCH in SF0 will have sub frame ID set to 0, whereas BCH in SF1 will have sub frame ID set to 1. In this method, even the paging receiver which is not looking for paging can receive the SCH/BCH and can perform the DL synchronization. In another method different preamble of synchronization sequence is used for SCH during normal SCH transmission and SCH transmission during the paging. The BCH content is same in both cases. In this case the additional SCH/BCH is only read by the paging receivers looking for paging.

According to an embodiment of Paging Channel Reception, paging receiver wakes up 'P−1' sub frames before the beginning of paging sub frame in the paging available interval. Paging receiver monitors the 'P' sub frames for receiving and decoding the SCH/BCH. Paging receiver monitors the 'P' sub frames by using the 'P' receive beams wherein different receive beam is used in different sub frames. If the SCH/BCH is received and decoded in any one of the 'P' sub frames then paging receiver stops monitoring the SCH/BCH in remaining of the 'P' sub frames.

Figure 19:
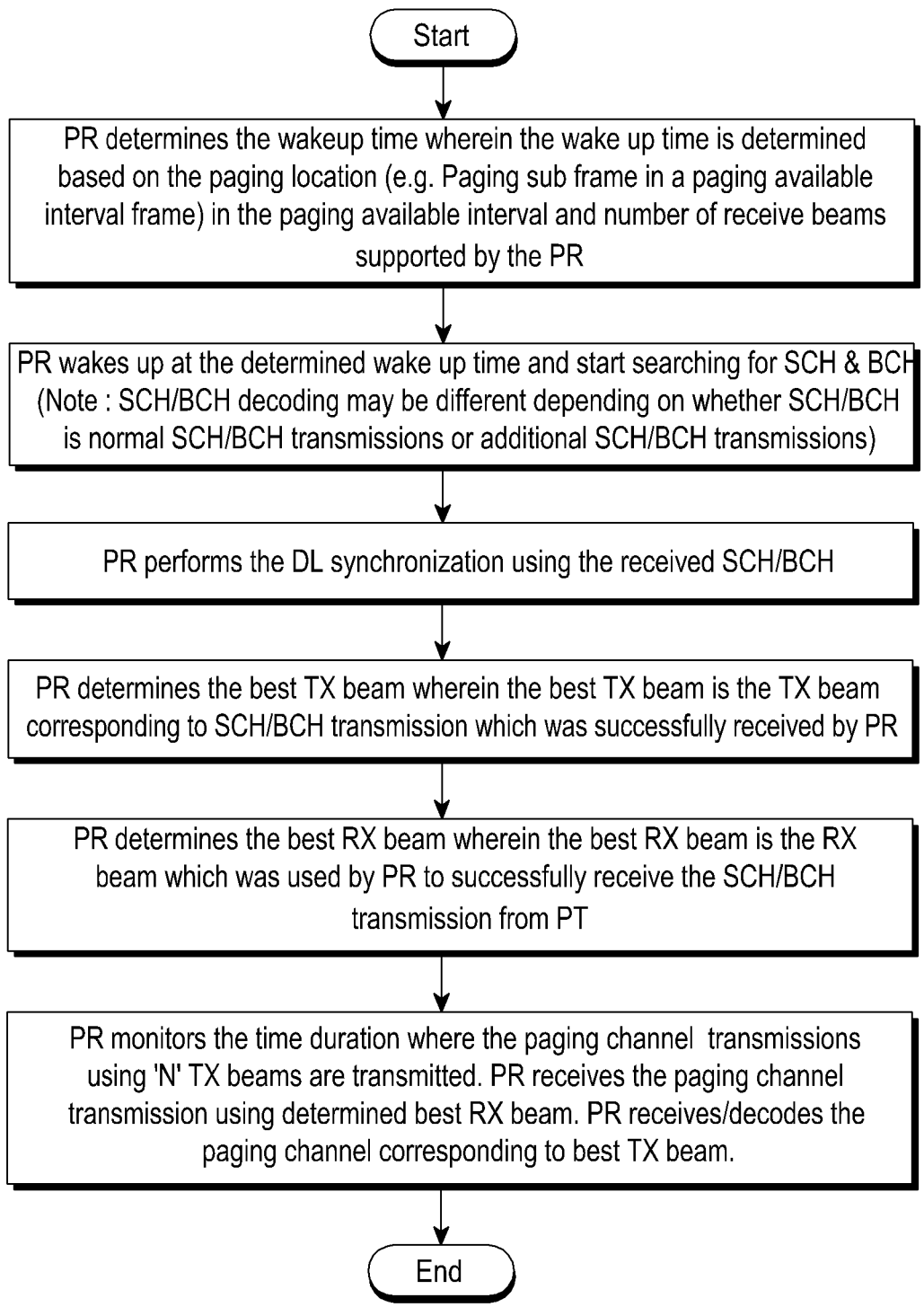
FIG. 19 illustrates a flow diagram of a method of receiving paging information by paging receiver, according to another embodiment.

FIG. 19 illustrates a flow diagram of a method of receiving paging information by paging receiver (PR), according to another embodiment. The paging receiver determines the best TX beam wherein the best TX beam is the beam which is used by paging transmitter (PT) for transmission of the SCH/BCH which was successfully decoded by the paging receiver. Paging receiver also determines the best RX beam wherein the RX beam is the one which is used by the paging receiver to successfully receive and decode the SCH/BCH. The determined best RX beam and TX beam are then used to receive the paging channel transmitted by paging transmitter (PT) using multiple TX beams. Paging receiver receives the paging channel using the best RX beam. Instead of receiving all paging channels corresponding to multiple TX beams paging receiver may only receive the paging channel corresponding to the best TX beam. Alternatively paging receiver can receive the paging channel corresponding to the best TX beam and if it fails to receive and decode the paging channel it can receive and decode the paging channel corresponding to other TX beams.

Figure 20:
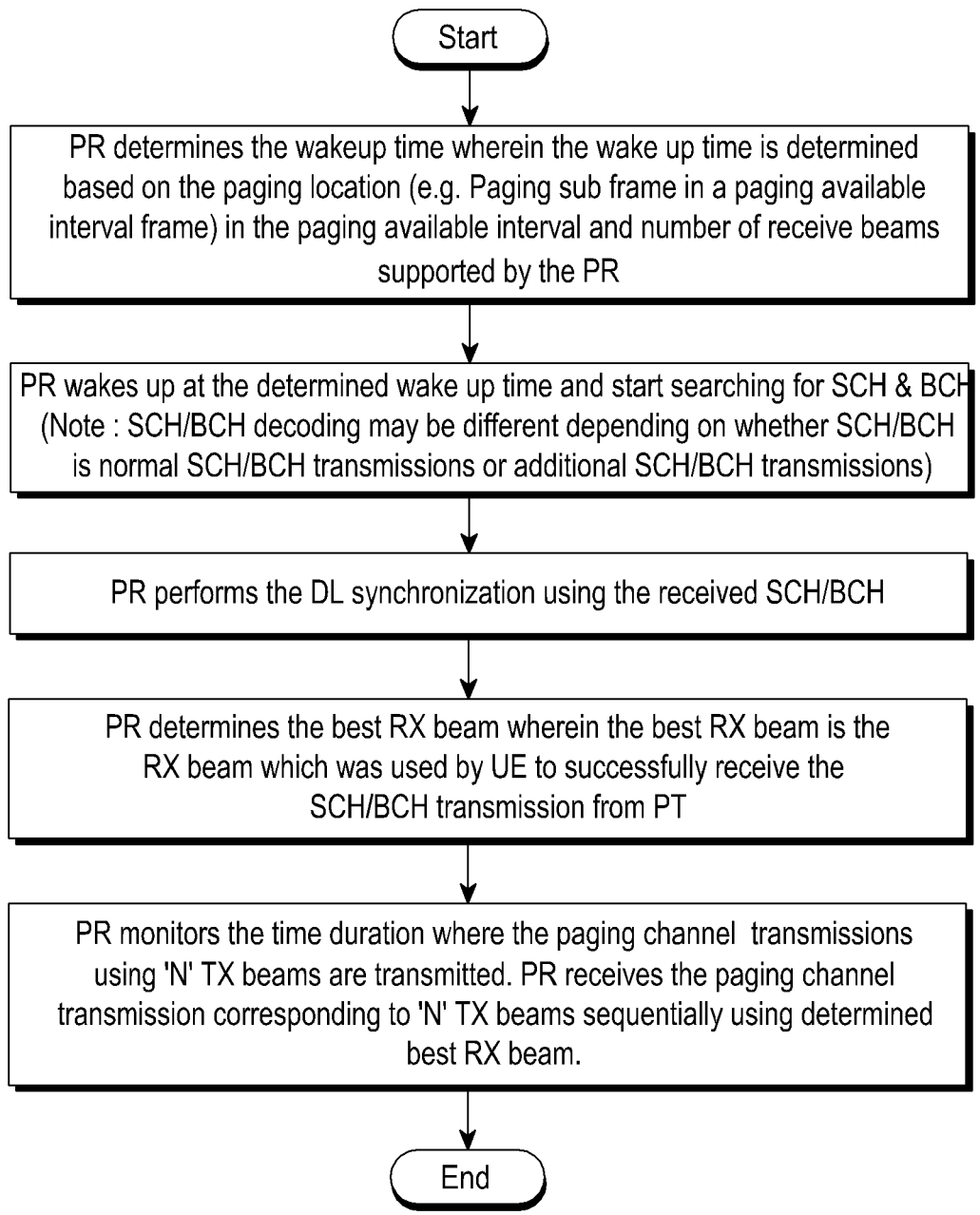
FIG. 20 illustrates a flow diagram of a method of receiving paging information by paging receiver, according to another embodiment.

FIG. 20 illustrates a flow diagram of a method of receiving paging information by paging receiver (PR), according to another embodiment. The Paging receiver only determines the best RX beam wherein the best RX beam is the one which is used by the paging receiver to successfully receive and decode the SCH/BCH. The Paging receiver does not concern about the best TX beam. Paging receiver receives the paging channel transmitted by the paging transmitter using multiple TX beams sequentially until the paging channel is received & decoded.

Location Update: In this embodiment paging receiver does not receive and decodes the SCH/BCH in every paging available interval. As a result paging receiver will not have information about the paging area change in case paging is not there in paging available interval as the paging area change information is present in the BCH. In order to overcome this drawback, the present disclosure provides a timer based location search wherein the paging receiver receives and decodes the SCH/BCH only if the location search timer is expired before the paging available interval. Location search timer is reset every time paging area information is read from BCH or BCH information carried in the paging channel. If the location search timer is not expired than paging receiver will not receive and decode the SCH/BCH in the paging available interval. It will only receive and decode the paging synchronization channel transmitted before paging channel and the paging channel.

Figure 21:
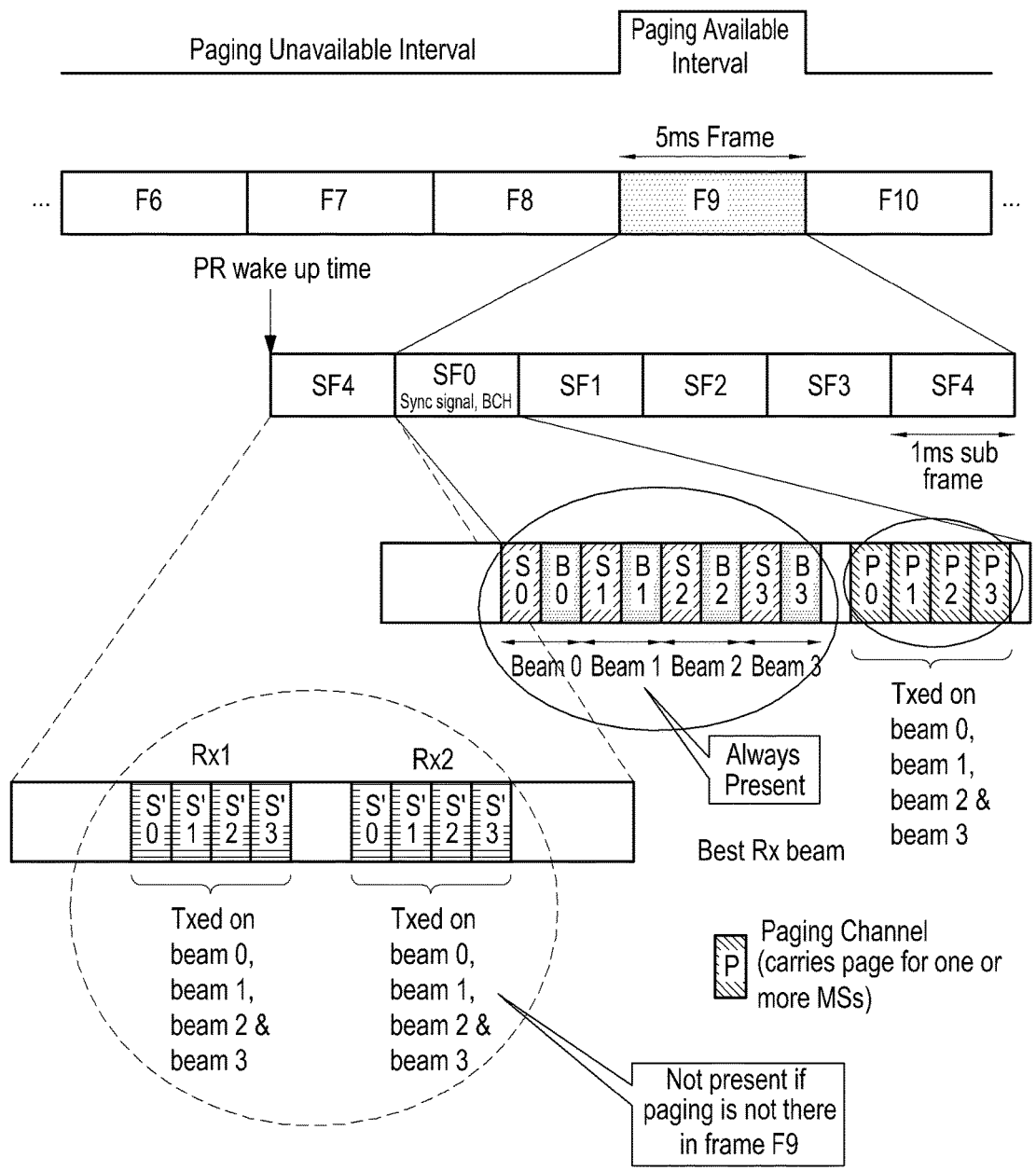
FIG. 21 illustrates a schematic diagram depicting transmission and reception of paging information on a paging channel using 'N' transmitting (Tx) beams in a paging available interval, according to yet further embodiment.
Figure 22:
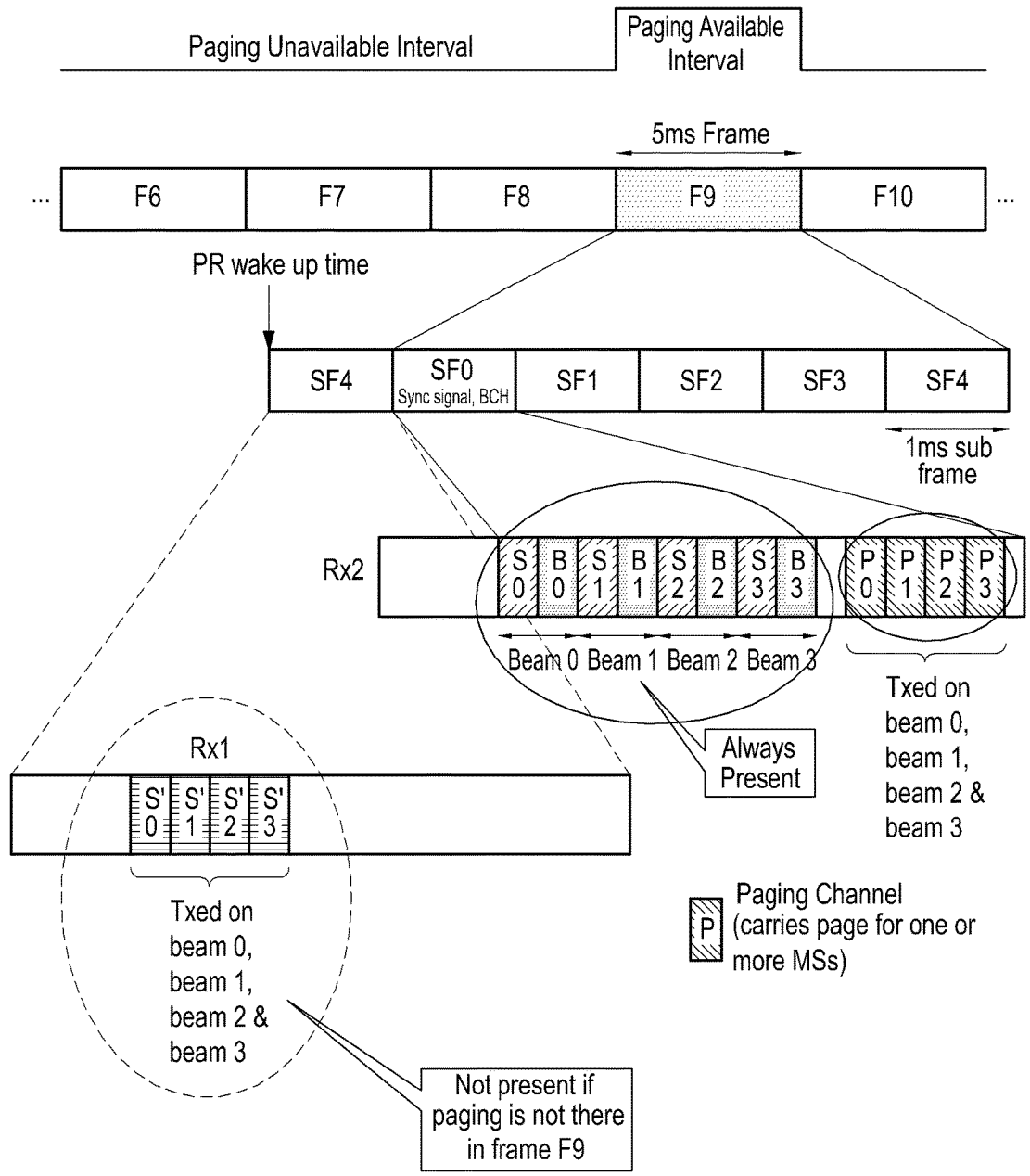
FIG. 22 illustrates a schematic diagram depicting transmission and reception of paging information on a paging channel using 'N' transmitting (Tx) beams in a paging available interval, according to yet further embodiment.
Figure 23:
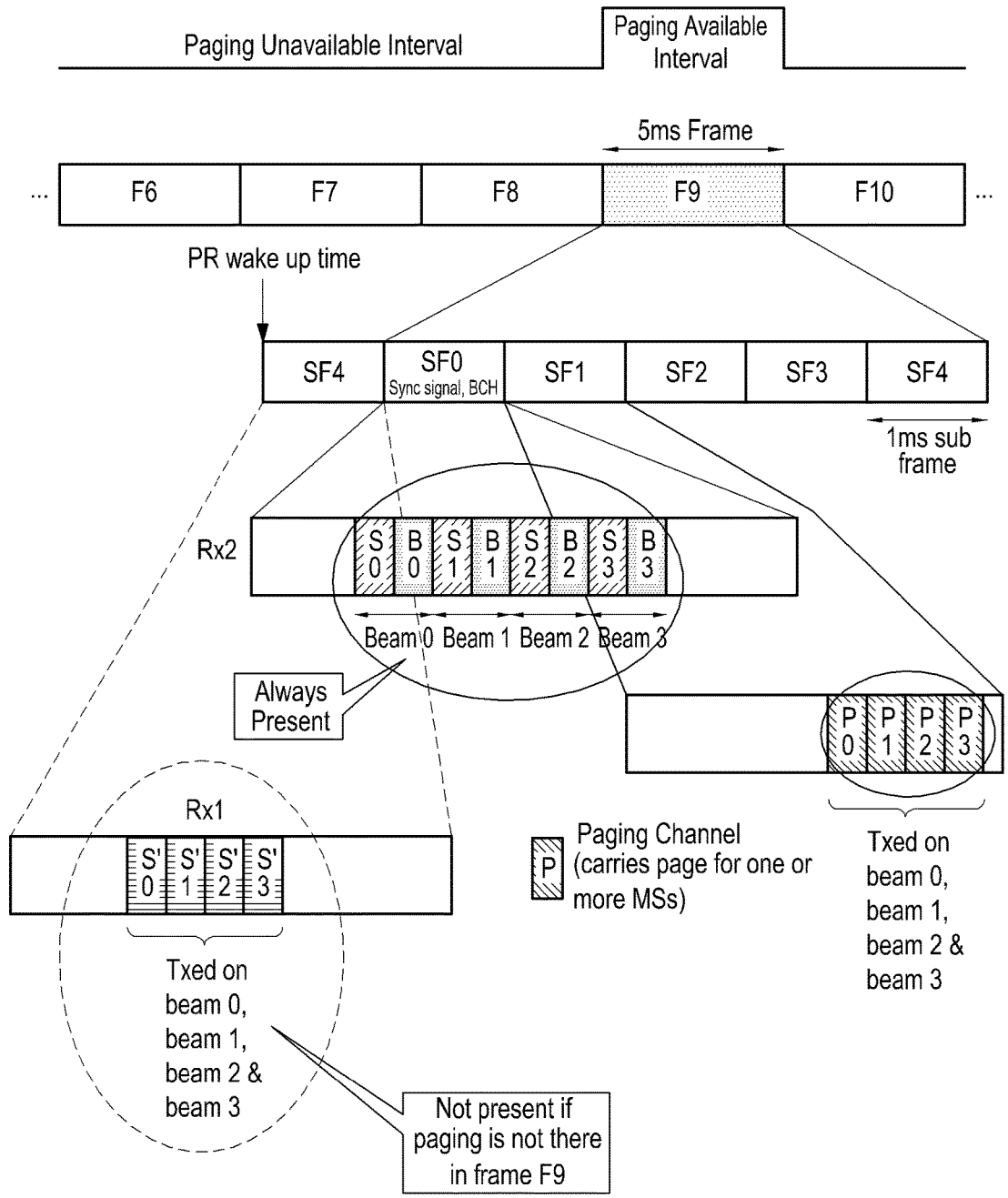
FIG. 23 illustrates a schematic diagram depicting transmission and reception of paging information on a paging channel using 'N' transmitting (Tx) beams in a paging available interval, according to yet further embodiment.

FIGS. 21, 22, & 23 illustrate schematic diagrams depicting transmission and reception of paging information on a paging channel using 'N' transmitting (TX) beams in a paging available interval, according to three further embodiments.

According to one embodiment of the Paging Channel Transmission, the paging channel carrying paging information is transmitted using 'N' transmitting (TX) beams in the paging available interval as illustrated in FIG. 21. The paging channel using 'N' TX beams can be transmitted in 'N' different time durations if only one antenna array is available with paging transmitter (PT) for transmitting paging channel. The paging channel using 'N' TX beams can be transmitted in 'N/2' different time durations if two antenna arrays are available with paging transmitter (PT) for transmitting paging channel and so on. The paging channel transmission using 'N' TX beams is not repeated for multiple receive (RX) beams in paging receiver which means that only one set of 'N' TX beams is transmitted by paging transmitter. In a beam-formed system paging receiver (PR) typically receives the transmission using multiple RX beams wherein the paging receiver uses one RX beam to receive one set of 'N' TX beams and same is repeated for each RX beam.

The paging available interval can be of one frame duration wherein each frame comprises of multiple sub frames. Paging channel may be present in one or more SFs of paging available interval wherein the paging channel in different SFs carries different paging information (e.g. Different set of paging receivers may be assigned different SF for paging). The number of paging channel TX beams in this embodiment of the disclosure is equal to number of SCH/BCH beams. The order of transmission of TX beams for paging channel is same as order of SCH/BCH beams. Paging channel sub frame for paging may be fixed (pre-specified) i.e. paging channel for all paging receivers in a paging available interval is fixed. Alternatively paging channel SF in paging available interval can be specific to paging receiver. BCH may indicate if paging is there in PAI or not. BCH of PAI Frame and up to P frames before PAI should include paging indicator for paging in PAI Frame. The resources for paging channel transmissions in paging SF may be fixed or indicated by a control channel.

In this embodiment of the present disclosure additional SCH are transmitted by the paging transmitter (PT). The additional SCH is transmitted only if paging is there in time durations (paging subframe) meant for paging. The time durations or SFs where additional SCH/BCH are transmitted is before the SF in which normal SCH/BCH are transmitted in paging available interval. The number of additional SCH transmissions is equal to 'P' or 'P−1' where P is the number of received beams in paging receiver. For the case of two received beams, the additional SCH is transmitted in SF before the beginning of paging available interval as illustrated in FIG. 21, FIG. 22 & FIG. 23. Each set of additional SCH transmission comprises of transmissions using multiple TX beams. Two sets of additional SCH transmission comprises of transmissions using multiple TX beams, is transmitted in SF before the beginning of paging available interval which is in case of two receive beams in paging receiver. This is illustrated in FIG. 21. Alternately one set of additional SCH transmission comprises of transmissions using multiple TX beams, is transmitted in SF before the beginning of paging available interval in case of two receive beams in paging receiver (PR). This is illustrated in FIG. 22 & FIG. 23. The additional SCH transmissions are present only when paging is there in the paging available interval.

The additional SCH transmitted because of paging, differs from normal SCH transmission as follows: Different preamble or synchronization sequence is used for SCH during normal SCH transmission and additional SCH transmissions because of paging.

In the embodiment of the Paging Channel Reception, paging receiver wakes up before the beginning of paging available interval. The number of sub frames to wake up earlier depends on the number of sub frames defined in system for transmitting the additional. SCH transmissions. Paging receiver monitors the time durations for additional SCH transmissions.

Figure 24:
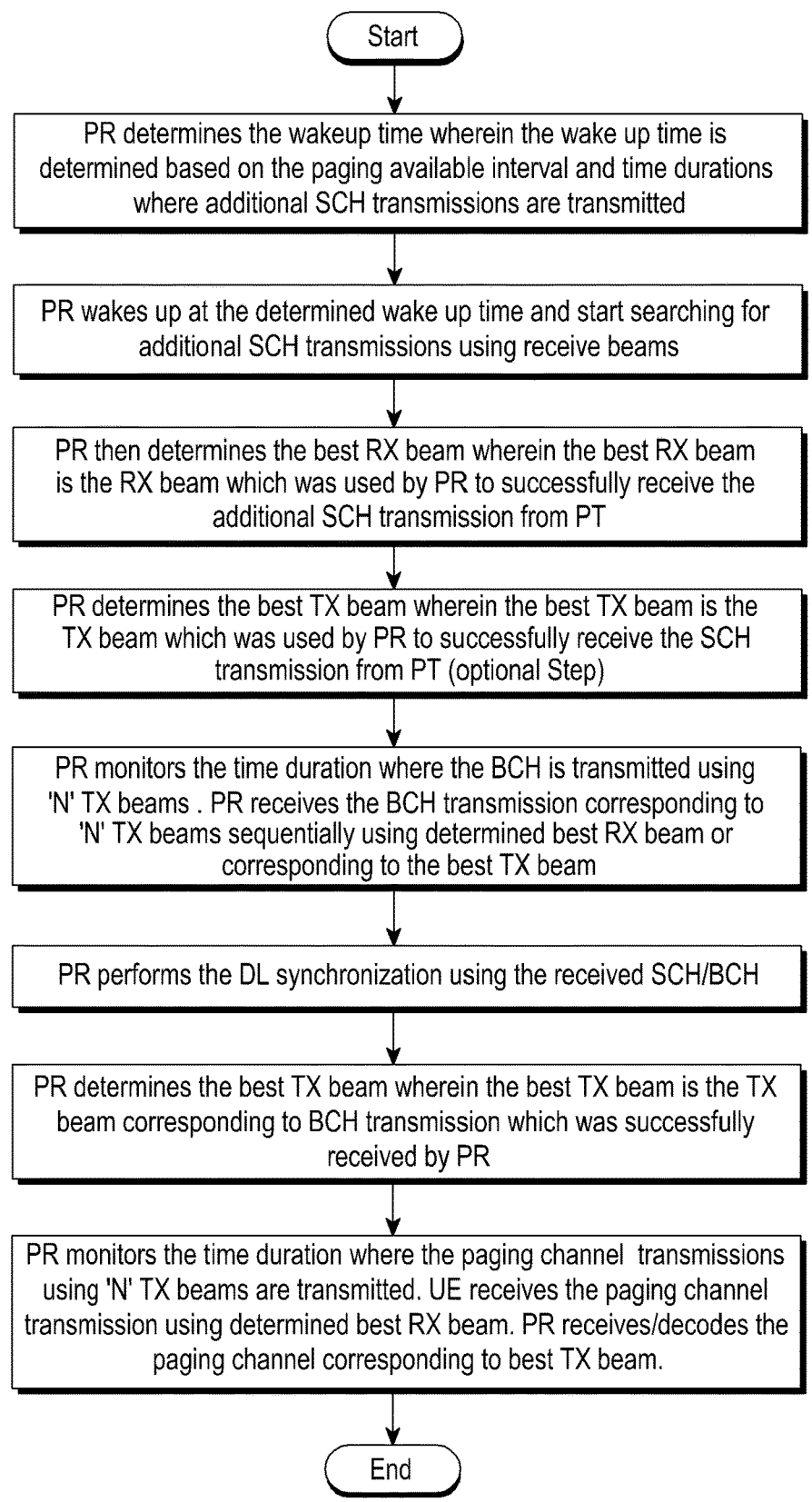
FIG. 24 illustrates a flowchart depicting a method of receiving paging information by paging receiver, according to yet further embodiment.
Figure 25:
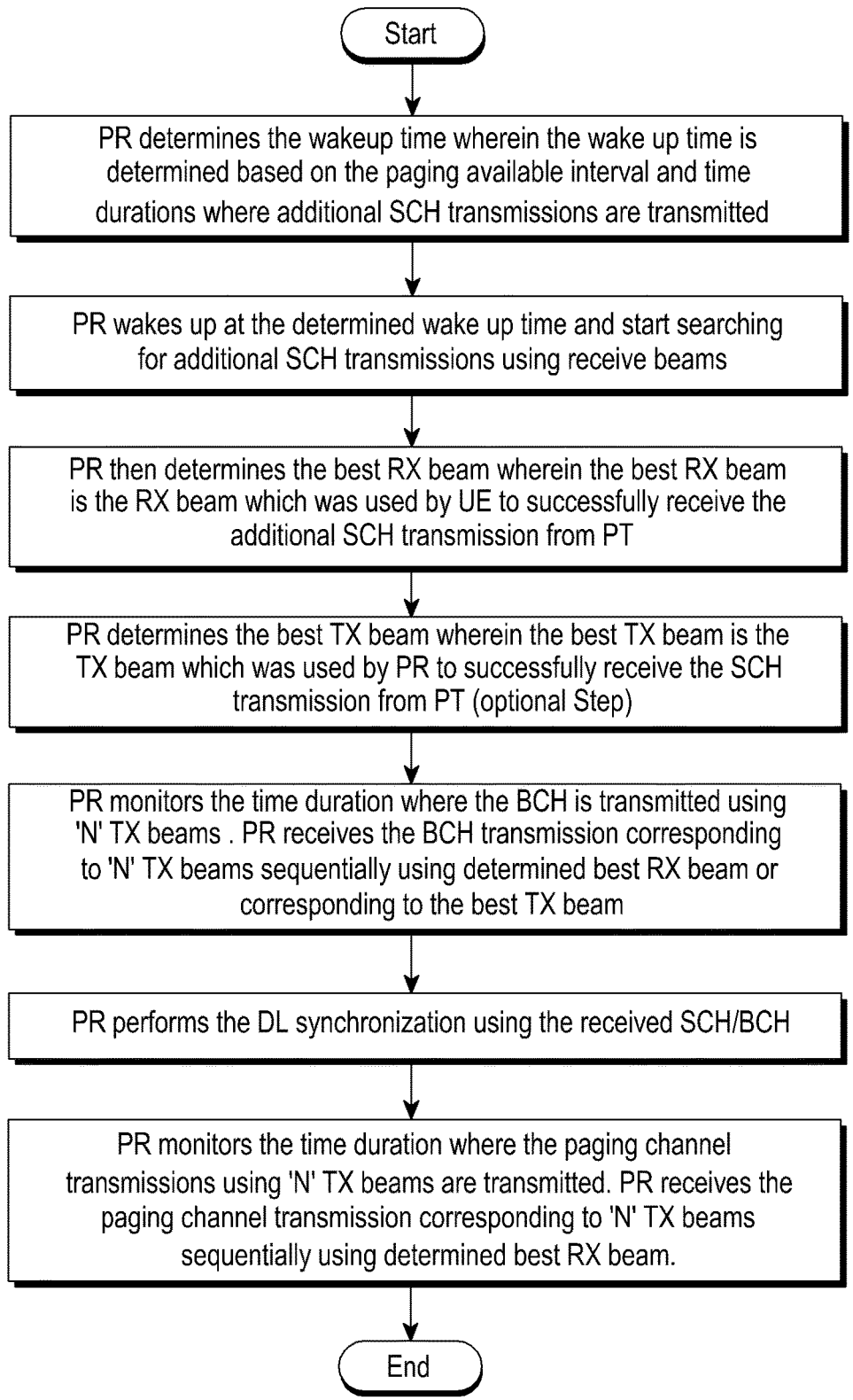
FIG. 25 illustrates a flowchart depicting a method of receiving paging information by paging receiver, according to yet further embodiment.

FIGS. 24 & 25 illustrate two flowcharts depicting a method of receiving paging information by paging receiver (PR), according to two embodiments.

Paging receiver monitors the time durations for additional SCH transmissions using the 'P' receive beams wherein different receive beam is used to receive different set of SCH transmissions. If the SCH is received and decoded in any one set of additional SCH transmissions paging receiver stops monitoring the SCH. The paging receiver then determines the best RX beam wherein the RX beam is the one which is used by the paging receiver to successfully receive and decode the SCH paging receiver uses the best RX beam to decode the BCH transmissions. Paging receiver may sequentially receive and decode the BCH transmissions corresponding to multiple TX beams or it can decode the BCH transmission corresponding to the best TX beam wherein the best TX beam is the beam which is used by paging transmitter (PT) for transmission of the BCH which was successfully decoded by the paging receiver. After decoding the BCH transmission paging receiver receives and decodes the paging channel. In one exemplary method as illustrated in FIG. 24, in order to receive and decode the paging channel, paging receiver determines the best TX beam wherein the best TX beam is the beam which is used by paging transmitter (PT) for transmission of the BCH which was successfully decoded by the paging receiver and paging receiver also determines the best RX beam wherein the best RX beam is the one which is used by the paging receiver to successfully receive and decode the SCH. The determined best RX beam and TX beam are then used to receive the paging channel transmitted by paging transmitter (PT) using multiple TX beams. The paging receiver receives the paging channel using the best RX beam. Instead of receiving all paging channels corresponding to multiple TX beams paging receiver may only receive the paging channel corresponding to the best TX beam. Alternatively paging receiver can receive the paging channel corresponding to the best TX beam and if it fails to receive and decode the paging channel it can receive and decode the paging channel corresponding to other TX beams. In another method as illustrated in FIG. 25 in order to receive and decode the paging channel, paging receiver only determines the best RX beam wherein the RX beam is the one which is used by the paging receiver to successfully receive and decode the BCH. The paging receiver does not care about the best TX beam. Paging receiver receives the paging channel transmitted by the paging transmitter using multiple TX beams sequentially until the paging channel is received & decoded.

FIGS. 26 & 27 illustrate two flowcharts depicting a method of receiving paging information by a paging receiver (PR), according to two embodiments.

Figure 26A:
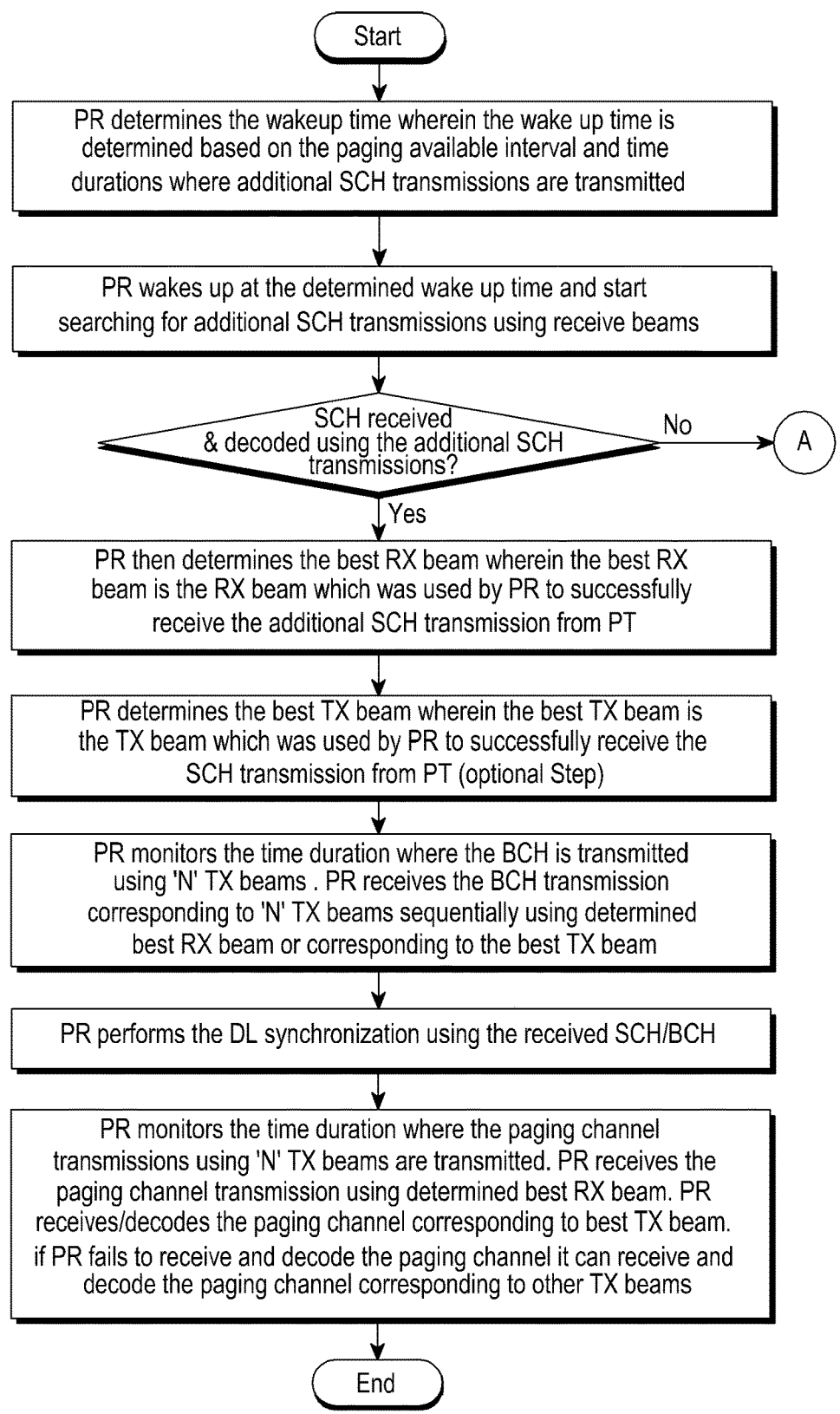
FIGS. 26a to 26b illustrate a flowchart depicting a method of receiving paging information by paging receiver, according to yet further embodiment.
Figure 26B:
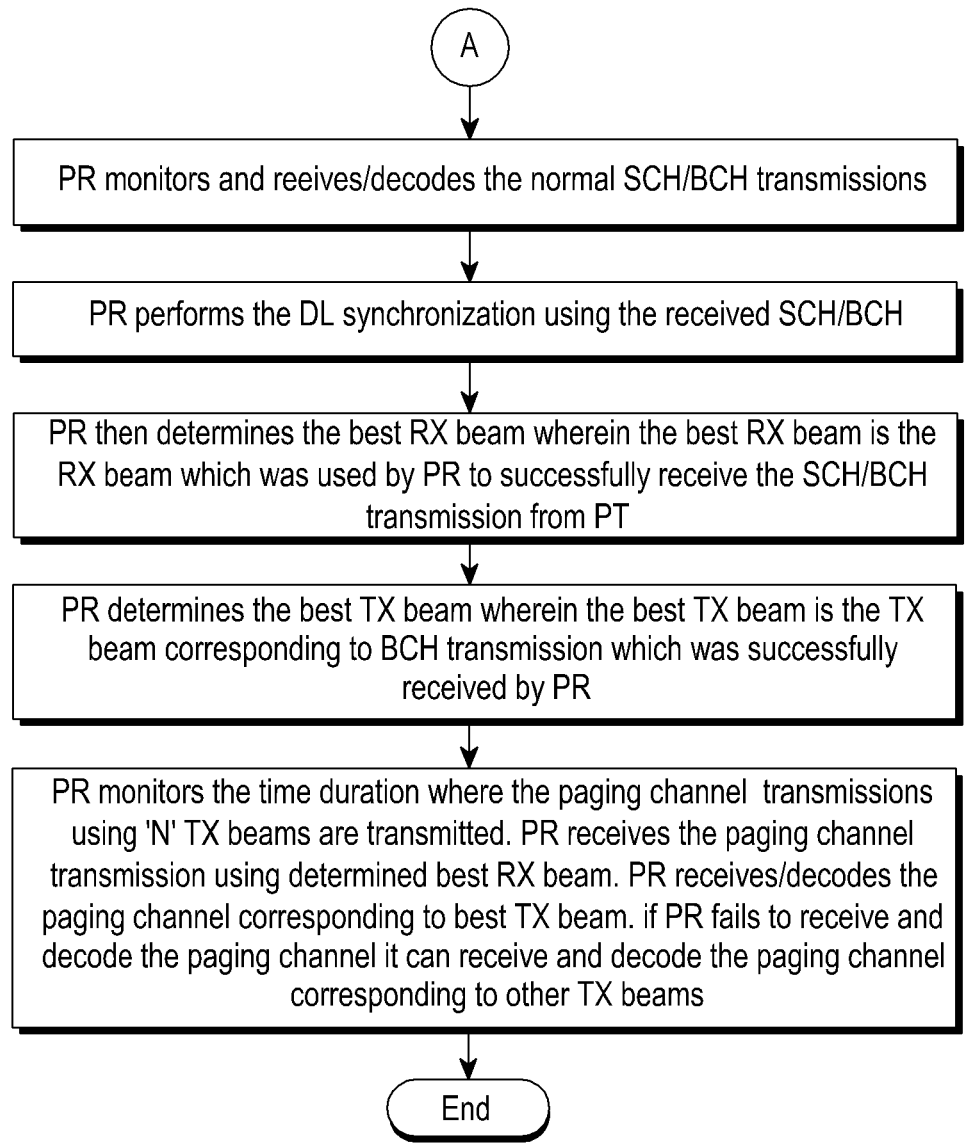
Figure 27A:
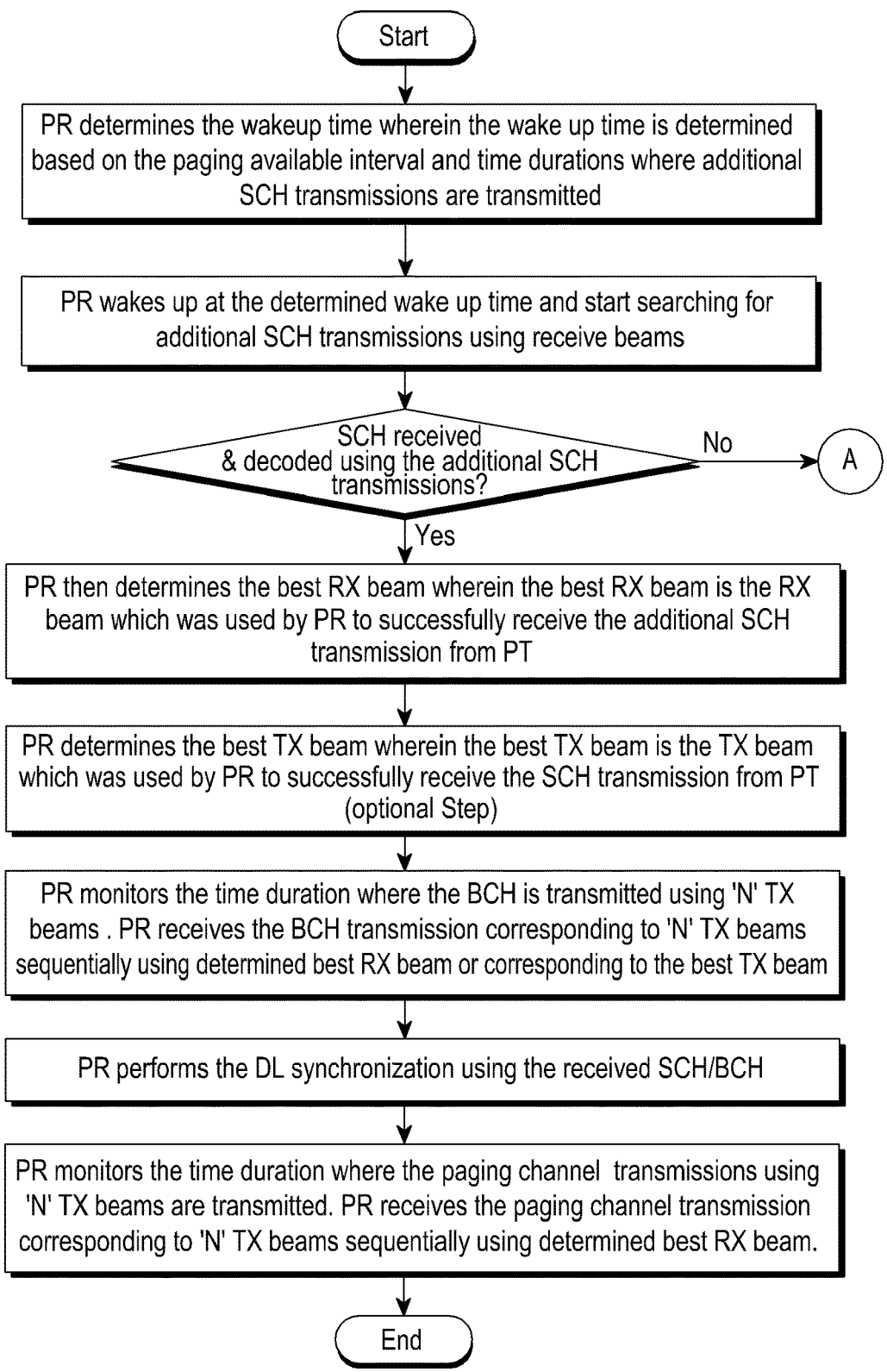
Figure 27B:
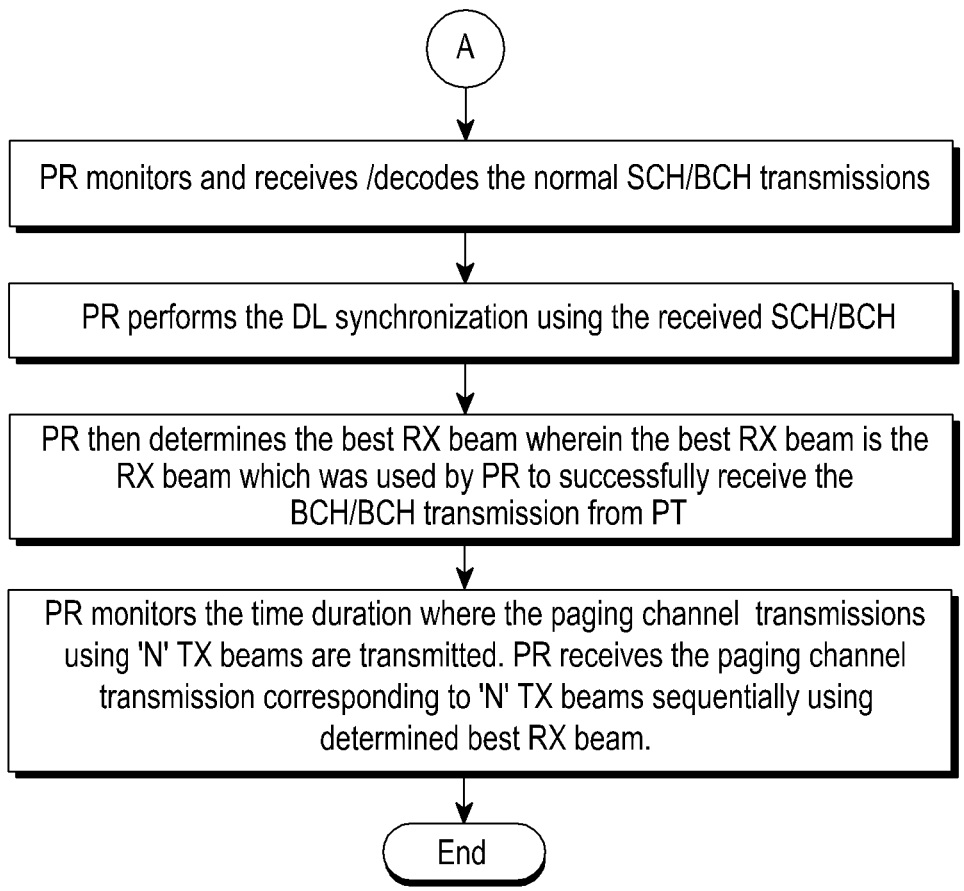

The paging receiver monitors the time durations for additional SCH transmissions using the 'P−1' receive beams wherein different receive beam is used to receive different set of SCH transmissions. If the SCH is received and decoded in any one set of additional SCH transmissions paging receiver stops monitoring the SCH. Paging receiver then determines the best RX beam wherein the RX beam is the one which is used by the paging receiver to successfully receive and decode the SCH paging receiver uses the best RX beam to decode the BCH transmissions. Paging receiver may sequentially receive and decode the BCH transmissions corresponding to multiple TX beams or it can decode the BCH transmission corresponding to the best TX beam wherein the best TX beam is the beam which is used by paging transmitter for transmission of the BCH which was successfully decoded by the paging receiver (PR). After decoding the BCH transmission, the paging receiver receives and decodes the paging channel. In one method as illustrated in FIGS. 26a to 26b in order to receive and decode the paging channel, paging receiver determines the best TX beam wherein the best TX beam is the beam which is used by paging transmitter (PT) for transmission of the BCH which was successfully decoded by the paging receiver, and paging receiver also determines the best RX beam wherein the best RX beam is the one which is used by the paging receiver to successfully receive and decode the SCH. The determined best RX beam and TX beam are then used to receive the paging channel transmitted by paging transmitter (PT) using multiple TX beams paging receiver receives the paging channel using the best RX beam. Instead of receiving all paging channels corresponding to multiple TX beams paging receiver may only receive the paging channel corresponding to the best TX beam. Alternatively paging receiver can receive the paging channel corresponding to the best TX beam and if it fails to receive and decode the paging channel it can receive and decode the paging channel corresponding to other TX beams. In another exemplary method as illustrated in FIGS. 27a to 27b in order to receive and decode the paging channel, paging receiver only determines the best RX beam wherein the RX beam is the one which is used by the paging receiver to successfully receive and decode the BCH. The paging receiver does not care about the best TX beam. Paging receiver receives the paging channel transmitted by the paging transmitter using multiple TX beams sequentially until the paging channel is received & decoded.

If the SCH is not received and decoded in any one set of additional SCH transmissions, the paging receiver monitors the normal SCH/BCH transmission. Paging receiver then determines the best RX beam wherein the RX beam is the one which is used by the paging receiver to successfully receive and decode the SCH/BCH. After decoding the SCH/BCH transmission paging receiver receives and decodes the paging channel. In one method as illustrated in FIGS. 26a to 26b in order to receive and decode the paging channel, paging receiver determines the best TX beam wherein the best TX beam is the beam which is used by paging transmitter (PT) for transmission of the SCH/BCH which was successfully decoded by the paging receiver and paging receiver also determines the best RX beam wherein the RX beam is the one which is used by the paging receiver to successfully receive and decode the SCH/BCH. The determined best RX beam and TX beam are then used to receive the paging channel transmitted by paging transmitter (PT) using multiple TX beams. Paging receiver receives the paging channel using the best RX beam. Instead of receiving all paging channels corresponding to multiple TX beams paging receiver may only receive the paging channel corresponding to the best TX beam. Alternatively paging receiver can receive the paging channel corresponding to the best TX beam and if it fails to receive and decode the paging channel it can receive and decode the paging channel corresponding to other TX beams. In another method as illustrated in FIGS. 27a to 27b in order to receive and decode the paging channel, paging receiver only determines the best RX beam wherein the RX beam is the one which is used by the paging receiver to successfully receive and decode the SCH/BCH. Paging receiver does not care about the best TX beam. Paging receiver receives the paging channel transmitted by the paging transmitter (PT) using multiple TX beams sequentially until the paging channel is received & decoded.

Location Update: In this embodiment paging receiver (PR) does not receive and decodes the SCH/BCH in every paging available interval. As a result paging receiver will not have information about the paging area change in case paging is not there in paging available interval as the paging area change information is present in the BCH. In order to solve this problem we propose a timer based location search wherein the paging receiver receives and decodes the SCH/BCH only if the location search timer is expired before the paging available interval. Location search timer is reset every time paging area information is read from BCH or BCH information carried in the paging channel. If the location search timer is not expired than paging receiver will not receive and decode the SCH/BCH in the paging available interval. It will only receive and decode the paging synchronization channel transmitted before paging channel and the paging channel.

In the methods described in the present disclosure, the paging transmitter can be a base station (BS) or enhanced nodeB or any other network node. In the methods described in the disclosure the paging receiver can be user equipment (UE) or mobile station or any other receiver capable of receiving the paging.

Meanwhile, an inner structure of a transmitting apparatus and a receiving apparatus will be described with reference to FIGS. 28 and 29.

Firstly, an inner structure of a transmitting apparatus in a beam formed wireless communication network according to an embodiment of the present disclosure will be described with reference to FIG. 28.

Figure 28:
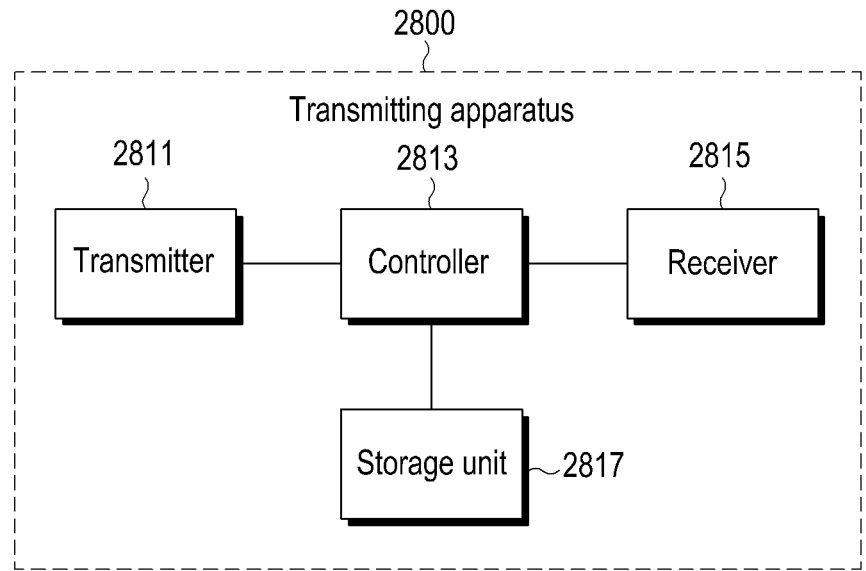
FIG. 28 schematically illustrates an inner structure of a transmitting apparatus in a beam formed wireless communication network according to an embodiment of the present disclosure.

FIG. 28 schematically illustrates an inner structure of a transmitting apparatus in a beam formed wireless communication network according to an embodiment of the present disclosure.

Referring to FIG. 28, a transmitting apparatus 2800 includes a transmitter 2811, a controller 2813, a receiver 2815, and a storage unit 2817.

The controller 2813 controls the overall operation of the transmitting apparatus 2800. More particularly, the controller 2813 controls the transmitting apparatus 2800 to perform an operation related to paging transmission/reception. The operation related to the paging transmission/reception is performed in the manner described with reference to FIGS. 2 to 27b and a description thereof will be omitted herein.

The storage unit 2817 stores a program, various data, and the like necessary for an operation of the transmitting apparatus 2800, i.e., the operation related to the paging transmission/reception in FIGS. 2 to 27b.

The transmitter 2811 transmits various messages, and the like to a receiving apparatus under a control of the controller 2813. The various messages, and the like transmitted in the transmitter 2811 have been described in FIGS. 2 to 27b and a description thereof will be omitted herein.

The receiver 2815 receives various messages, and the like from the receiving apparatus under a control of the controller 2813. The various messages, and the like received in the receiver 2813 have been described in FIGS. 2 to 27b and a description thereof will be omitted herein.

While the transmitter 2811, the controller 2813, the receiver 2815, and the storage unit 2817 are described in the transmitting apparatus 2800 as separate units, it is to be understood that this is merely for convenience of description. In other words, two or more of the transmitter 2811, the controller 2813, the receiver 2815, and the storage unit 2817 may be incorporated into a single unit.

Secondly, an inner structure of a receiving apparatus in a beam formed wireless communication network according to an embodiment of the present disclosure will be described with reference to FIG. 29.

Figure 29:
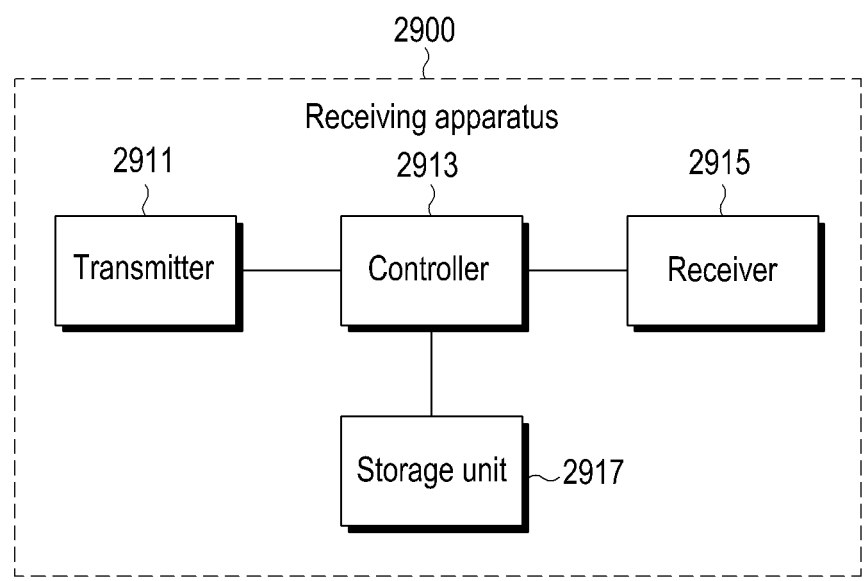
FIG. 29 schematically illustrates an inner structure of a receiving apparatus in a beam formed wireless communication network according to an embodiment of the present disclosure.

FIG. 29 schematically illustrates an inner structure of a receiving apparatus in a beam formed wireless communication network according to an embodiment of the present disclosure.

Referring to FIG. 29, a receiving apparatus 2900 includes a transmitter 2911, a controller 2913, a receiver 2915, and a storage unit 2917.

The controller 2913 controls the overall operation of the receiving apparatus 2900. More particularly, the controller 2913 controls the receiving apparatus 2900 to perform an operation related to paging transmission/reception. The operation related to the paging transmission/reception is performed in the manner described with reference to FIGS. 2 to 27b and a description thereof will be omitted herein.

The storage unit 2917 stores a program, various data, and the like necessary for an operation of the receiving apparatus 2900, i.e., the operation related to the paging transmission/reception in FIGS. 2 to 27b.

The transmitter 2911 transmits various messages, and the like to a transmitting apparatus under a control of the controller 2913. The various messages, and the like transmitted in the transmitter 2911 have been described in FIGS. 2 to 27b and a description thereof will be omitted herein.

The receiver 2915 receives various messages, and the like from the transmitting apparatus under a control of the controller 2913. The various messages, and the like received in the receiver 2913 have been described in FIGS. 2 to 27b and a description thereof will be omitted herein.

While the transmitter 2911, the controller 2913, the receiver 2915, and the storage unit 2917 are described in the receiving apparatus 2900 as separate units, it is to be understood that this is merely for convenience of description. In other words, two or more of the transmitter 2911, the controller 2913, the receiver 2915, and the storage unit 2917 may be incorporated into a single unit.

Certain aspects of the present disclosure may also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for communicating at a receiving apparatus based on a plurality of reception (RX) beams in a wireless communication network, the method comprising:
    receiving a broadcast channel (BCH) signal based on the RX beams in a first interval before a paging available interval (PAI);
    obtaining information indicating that a paging channel (PCH) signal is transmitted within the PAI from the BCH signal;
    determining a wake up time within a second interval before the PAI from an end point of the first interval based on the information; and
    after waking up at the determined wake up time, receiving the PCH signal based on one of the RX beams in a third interval included in the PAI.

2. The method of claim 1, further comprising:
    determining an RX beam used for successfully receiving the BCH signal among the RX beams; and
    receiving the BCH signal through the determined RX beam.

3. The method of claim 1, wherein a number of at least one first transmission (TX) beam to transmit the BCH signal and a number of at least one second TX beam to transmit the PCH signal are the same.

4. The method of claim 3, wherein a used order of the at least one first TX beam is the same as a used order of the at least one second TX beam.

5. The method of claim 1, further comprising:
    receiving the PCH signals based on the RX beams 'P' times in another third interval.

6. The method of claim 5, wherein P is determined based on a number of the RX beams.

7. The method of claim 1, wherein the receiving apparatus is a group comprising at least one receiver to transmit PCH signals through N TX beams 'P' times in another third interval.

8. The method of claim 7, wherein:
    if the at least one receiver includes at least two receivers, a number of RX beams supported in the at least two receivers is the same, and
    paging times for the at least two receivers are the same in the third interval and the other third interval.

9. The method of claim 8, further comprising:
    receiving a synchronization (SCH) signal through at least one TX beam periodically; and
    receiving an additional SCH signal or an additional BCH signal through the at least one TX beam in a time preceding the time interval.

10. The method of claim 9, wherein a number of the additional SCH signal or a number of the additional BCH signal is equal to or less than a number of RX beams supported in at least one receiver which receives PCH signals.

11. The method of claim 9, wherein a synchronization sequence included in the additional SCH signal is different from a synchronization sequence included in the periodically transmitted SCH signal.

12. A receiving apparatus for communicating based on a plurality of reception (RX) beams in a wireless communication network, the receiving apparatus comprising:
    a transceiver configured to receive a broadcast channel (BCH) signal based on the RX beams in a first interval before a paging available interval (PAI), and to receive a paging channel (PCH) signal based on one of the RX beams in a third interval included in the PAI after waking up at a wake up time; and
    a processor configured to obtain information indicating that the PCH signal is transmitted within the PAI from the BCH signal, and determine the wake up time within a second interval before the PAI from an end point of the first interval based on the information.

13. The receiving apparatus of claim 12, wherein the processor is configured to determine an RX beam used for successfully receiving the BCH signal among the RX beams, and control the transceiver to receive the BCH signal through the determined RX beam.

14. The receiving apparatus of claim 12, wherein a number of at least one first transmission (TX) beam to transmit the BCH signal and a number of at least one second (TX) beam to transmit the PCH signal are the same.

15. The receiving apparatus of claim 14, wherein a used order of the at least one first TX beam is the same as a used order of the at least one second TX beam.

16. The receiving apparatus of claim 12, wherein the transceiver is further configured to receive the PCH signals based on the RX beams 'P' times in another third interval.

17. The receiving apparatus of claim 16, wherein P is determined based on a number of the RX beams.

* * * * *